(12) United States Patent
Chong et al.

(10) Patent No.: US 9,881,237 B2
(45) Date of Patent: Jan. 30, 2018

(54) REAL-TIME LINE FEED MEASUREMENT OF INKJET PRINTER

(71) Applicant: CANON KABUSHIKI KAISHA, Tokyo (JP)

(72) Inventors: Eric Wai-Shing Chong, Carlingford (AU); Jumpei Ashida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 14/069,925

(22) Filed: Nov. 1, 2013

(65) Prior Publication Data

US 2014/0126000 A1 May 8, 2014

(30) Foreign Application Priority Data

Nov. 5, 2012 (AU) .................. 2012244383

(51) Int. Cl.
*G06K 15/02* (2006.01)
(52) U.S. Cl.
CPC .................. *G06K 15/027* (2013.01)
(58) Field of Classification Search
CPC .................. B41J 2/2132; B41J 2/2135
USPC .............. 358/1.2, 1.9, 3.06, 3.11, 3.27
See application file for complete search history.

(56) References Cited

U.S. PATENT DOCUMENTS

| | | | | | |
|---|---|---|---|---|---|
| 5,463,720 | A | * | 10/1995 | Granger | H04N 1/4058 358/1.9 |
| 5,896,230 | A | * | 4/1999 | Goggins | G02B 27/2214 355/22 |
| 7,382,897 | B2 | * | 6/2008 | Brown | G06K 9/4609 358/450 |
| 8,233,586 | B1 | * | 7/2012 | Boas | G06T 11/005 378/207 |
| 2004/0086155 | A1 | * | 5/2004 | Furukawa | G06T 7/001 382/112 |
| 2009/0268254 | A1 | | 10/2009 | Morishita | |
| 2011/0007371 | A1 | * | 1/2011 | Yip | B41J 2/2135 358/504 |

(Continued)

FOREIGN PATENT DOCUMENTS

WO WO 2012090231 A1 * 7/2012 ............... H04N 1/60

OTHER PUBLICATIONS

V Ojansivu; J Heikkila, Image Registration Using Blur-Invariant Phase Correlation. IEEE Signal Processing Letters publication. Jul. 4, 2007. pp. 449-452. vol. 14, Issue 7. IEEE Signal Processing Society, Piscataway, N.J., U.S.A.

*Primary Examiner* — Peter K Huntsinger
(74) *Attorney, Agent, or Firm* — Canon U.S.A., Inc. IP Division

(57) ABSTRACT

Disclosed is a method of determining characteristics of a printer, the method comprising the steps of receiving print data, defining dot locations to be printed on a print medium, determining from the dot locations a dot frequency measure reflecting the number of dots to be printed on at least a part of the print medium, forming a simulated reference image of the print data comprising simulated dots corresponding to the dot locations in the print data, determining a size of the simulated dots in the reference image, this size being inversely related to the dot frequency measure, printing the print data on the print medium using the image forming apparatus to form a printed image, and determining characteristics of the image forming apparatus by comparing the printed image and the simulated reference image.

27 Claims, 28 Drawing Sheets

(56) References Cited

U.S. PATENT DOCUMENTS

2014/0016140 A1* 1/2014 Malik ............... G06K 15/1871
358/1.2

* cited by examiner

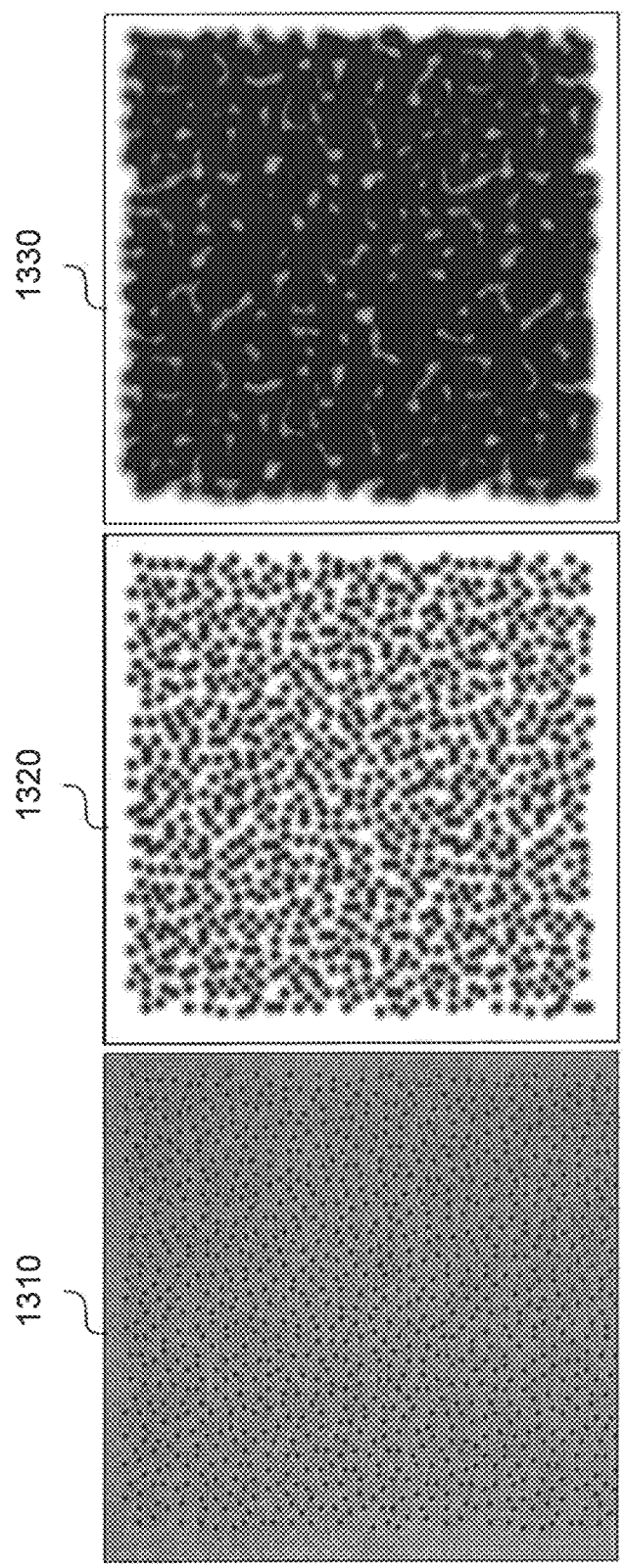

REAL-TIME LINE FEED MEASUREMENT OF INKJET PRINTER

REFERENCE TO RELATED PATENT APPLICATION(S)

This application claims the benefit under 35 U.S.C. § 119 of the filing date of Australian Patent Application No. 2012244383, filed 5 Nov. 2012, hereby incorporated by reference in its entirety as if fully set forth herein.

TECHNICAL FIELD

The current invention relates generally to printer calibration and, in particular, to a method of determining spatial characteristics of the printer by performing real time analysis of images printed by the printer.

BACKGROUND

In recent years high quality colour printers have become the norm. For inkjet printers, typical resolutions are 1200 dpi or higher, which translates into a printer ink dot size (and separation) of 20 microns or less. In many systems the inkjet printer may overprint regions multiple times to help minimise the effect of printer defects such as blocked print head nozzles. The optical density of a printed colour can be very sensitive to the precise value of the displacement between overprinted regions. This means, that at least for high quality, it is necessary to control or calibrate the exact displacement of the printer head between overprints.

Many approaches have been proposed for calibrating the movements of the print head relative to the medium being printed upon. One approach to the calibration of print head position uses measurement of individual dot positions. Unfortunately, despite the simple experimental set-up and straightforward result analysis of this approach, it is quite unreliable due to the large variations in dot shape, position and size. There is also the difficulty of unambiguously locating isolated dots in large regions on the medium being printed upon.

More robust methods have also been suggested to accommodate the aforementioned noise and ambiguity in order to achieve accurate measurement of print head position. Some methods measure the position of a print head by printing specially designed test charts and subsequently scanning the printed image to find the relative shift of each overprint using Fourier analysis. Although these methods are robust to noise, they involve complex computation and are not performed in real-time due to the separate printing and scanning processes that are involved.

Other methods include a method described in US 2009/0268254 wherein an optical sensor is used to measure and correct print density error. However, the printing area to be corrected needs to be covered by the field of view of the sensor. Therefore, this method can be costly and require a considerable amount of computational power. Moreover, some print defects caused by line feed error cannot be corrected in this way.

SUMMARY

It is an object of the present invention to substantially overcome, or at least ameliorate, one or more disadvantages of existing arrangements.

Disclosed are arrangements, referred to as Adaptive Dot Growth Correlation (ADGC) arrangements, that seek to address the above problems by improving correlation accuracy between a reference pattern of dots and a printed pattern of the same dots by adaptively growing the dots of the reference pattern dependent upon the locations of the dots in the reference pattern, thereby reducing correlation error between the reference pattern and the printed pattern. This improves the accuracy of measurements such as line feed error.

According to a first aspect of the present invention, there is provided a method of determining a characteristic of an image forming apparatus, said method comprising the steps of:

receiving print data, defining a plurality of dot locations, to be printed on a print medium by the image forming apparatus;

determining from said plurality of dot locations a dot frequency measure reflecting a number of dots to be printed on at least a part of the print medium;

forming a simulated reference image of the print data comprising a plurality of simulated dots corresponding to the plurality of dot locations in the print data;

determining a size of the simulated dots in the reference image, said size being inversely related to the dot frequency measure;

printing the print data on the print medium using the image forming apparatus to form a printed image; and determining a characteristic of the image forming apparatus based upon a comparison of the printed image and the simulated reference image.

According to another aspect of the present invention, there is provided a method of determining a characteristic of an image forming apparatus, said method comprising the steps of:

receiving print data, defining a plurality of dot locations, to be printed on a print medium by the image forming apparatus;

forming a simulated reference image of the print data comprising a plurality of simulated dots corresponding to the plurality of dot locations in the print data, wherein a size of the simulated dots in the reference image is determined from the distances between the dot locations defined by the print data;

printing the print data on the print medium using the image forming apparatus to form a printed image; and determining a characteristic of the image forming apparatus based upon a comparison of the printed image and the simulated reference image.

Other aspects of the invention are also disclosed.

BRIEF DESCRIPTION OF THE DRAWINGS

One or more embodiments of the invention will now be described with reference to the following drawings, in which:

FIGS. 13A, 13B and 13C show examples of simulated and real inkjet dot patterns;

DETAILED DESCRIPTION INCLUDING BEST MODE

Figure 1A:
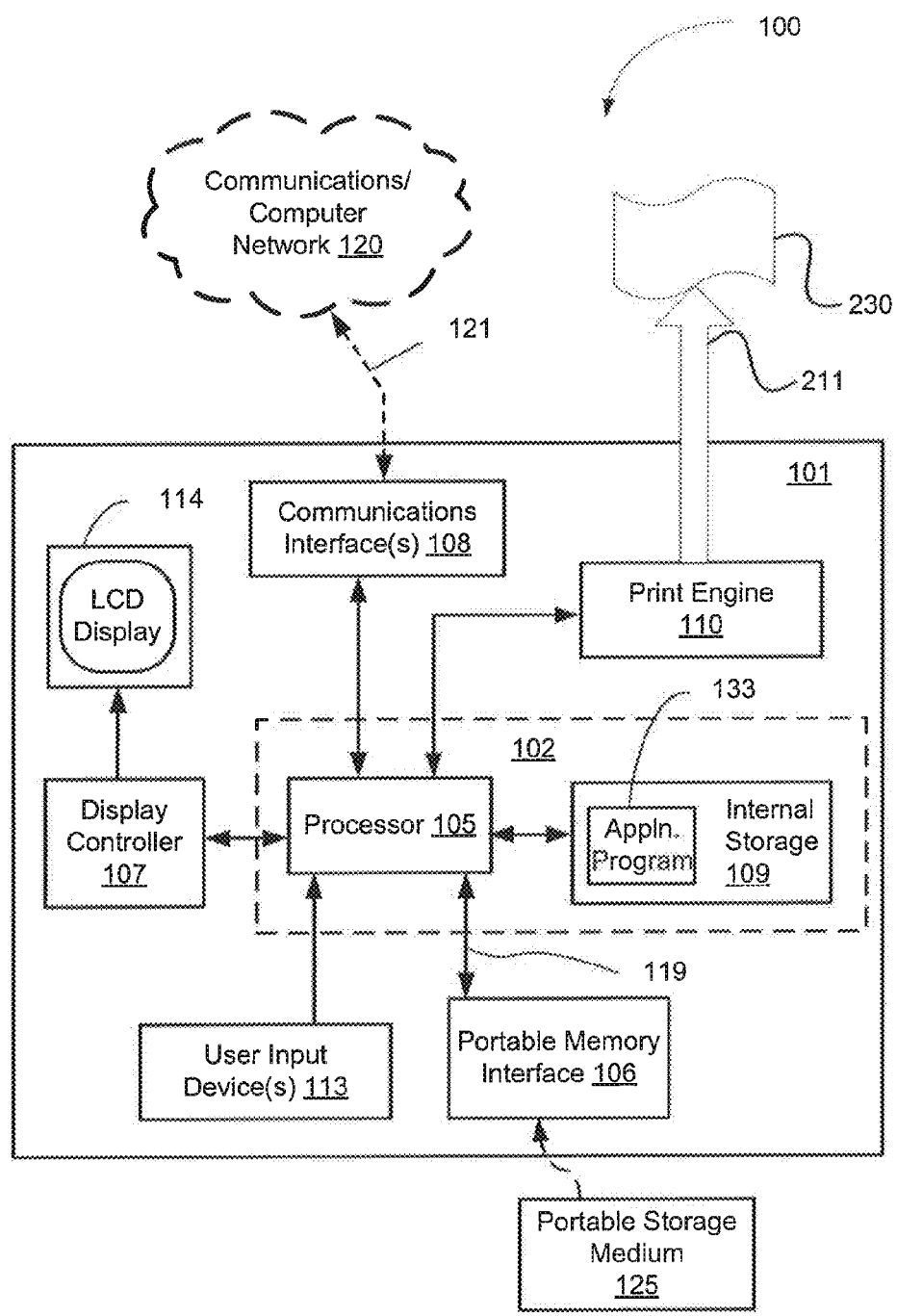
FIGS. 1A and 1B collectively form a functional block diagram representation of a printer upon which described ADGC arrangements can be practised.

Where reference is made in any one or more of the accompanying drawings to steps and/or features which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Processing Environment

Figure 1B:
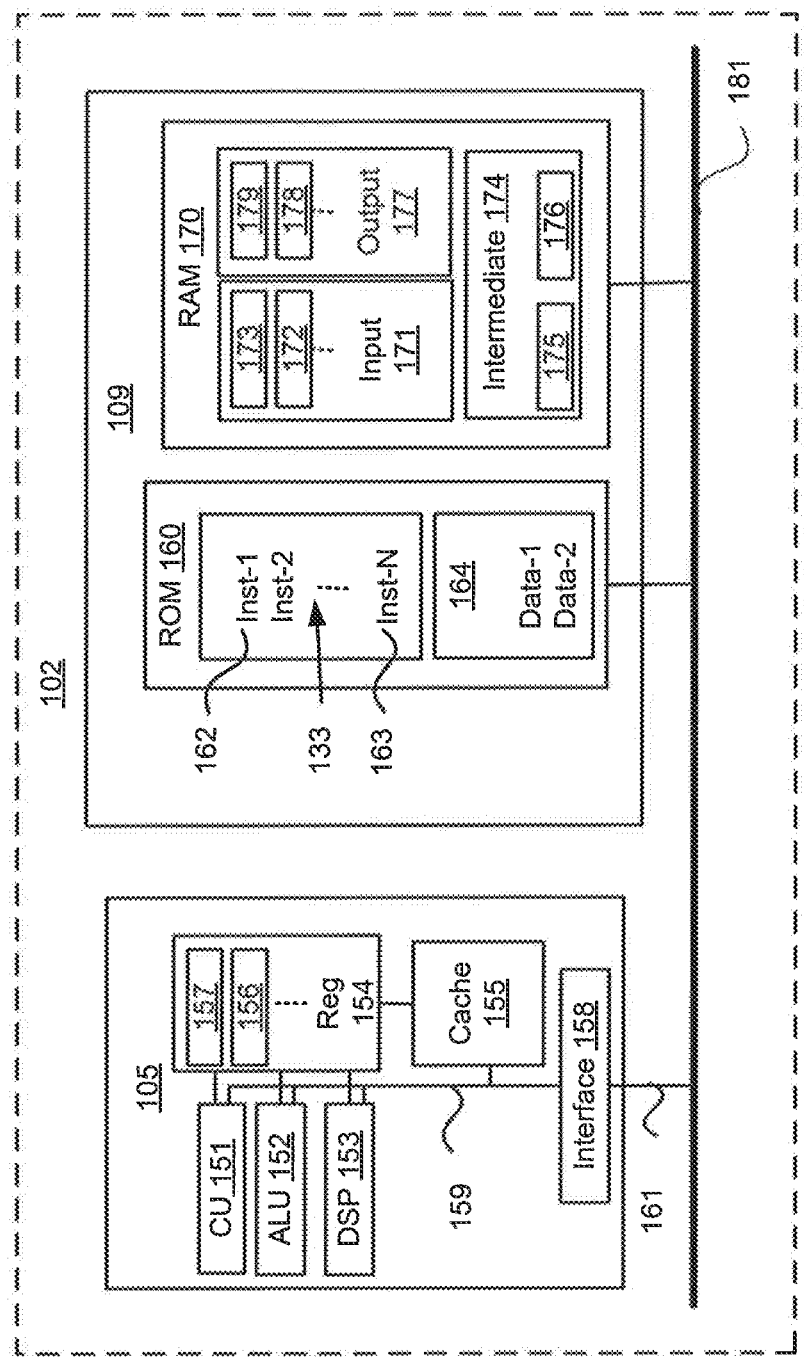

FIGS. 1A and 1B collectively form a functional block diagram representation of a printer 101 (or more generally an image forming apparatus 101) upon which described ADGC arrangements can be practised. The printer 101 incorporates a general-purpose electronic device including embedded components, upon which the ADGC methods to be described are desirably practised.

As seen in FIG. 1A, the printer 101 comprises an embedded controller 102 which, under control of an ADGC software program 133 stored in a memory 109, directs a print engine 110 to print images according to the ADGC methods on a print medium 230 as depicted by a broad arrow 211. Accordingly, the controller 102 may be referred to as an "embedded device." In the present example, the controller 102 has a processing unit (or processor) 105 that is bi-directionally coupled to the internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The printer 101 includes a display controller 107, which is connected to an LCD display 114. The display controller 107 is configured for displaying graphical images on the LCD display 114 in accordance with instructions received from the embedded controller 102, to which the display controller 107 is connected.

The printer 101 also includes user input devices 113 that are typically formed by keys, a keypad or similar controls. In some implementations, the user input devices 113 may include a touch sensitive panel physically associated with the display 114 to collectively form a touch-screen. Such a touch-screen may thus operate as one form of graphical user interface (GUI), as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the printer 101 also comprises a portable memory interface 106, which is coupled to the processor 105 via a connection 119. The portable memory interface 106 allows a corresponding portable memory device 125 to be coupled to the electronic device 101 to act as a source or destination of data or to supplement the internal storage module 109. Examples of such interfaces that permit coupling with portable memory devices include Universal Serial Bus (USB) memory devices, Secure Digital (SD) cards, Personal Computer Memory Card International Association (PCMIA) cards, optical disks and magnetic disks.

The printer 101 also has a communications interface 108 to permit coupling of the printer 101 to a computer or communications network 120 via a connection 121. The connection 121 may be wired or wireless. For example, the connection 121 may be radio frequency or optical. An example of a wired connection includes Ethernet. Further examples of wireless connection include Bluetooth® type local interconnection, Wi-Fi (including protocols based on the standards of the IEEE 802.11 family), Infrared Data Association (IrDa) and the like. The print engine 110 is connected to the embedded controller 102.

The ADGC methods described hereinafter may be implemented using a system 100 including the embedded controller 102, where the processes of FIGS. 4, 5, 9, 12, 15 and 19 may be implemented as one or more ADGC software application programs 133 executable within the embedded controller 102. The printer 101 of FIG. 1A implements the described ADGC methods. In particular, with reference to FIG. 1B, the steps of the described ADGC methods are effected by instructions in the software 133 that are carried out within the controller 102. The software instructions may be formed as one or more code modules, each for performing one or more particular tasks. The ADGC software may also be divided into two separate parts, in which a first part and the corresponding code modules performs the described ADGC methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from the ROM 160 into the RAM 170. Alternatively, the software instructions of one or more code modules may be pre-installed in a non-volatile region of the RAM 170 by a manufacturer. After one or more code modules have been located in the RAM 170, the processor 105 may execute software instructions of the one or more code modules.

The ADGC application program 133 is typically pre-installed and stored in the ROM 160 by a manufacturer, prior to distribution of the printer 101. However, in some instances, the ADGC application programs 133 may be supplied to the user encoded on one or more CD-ROMs (such as 125) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. The term "computer readable storage media" refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the printer 101. Examples of transitory or non-tangible "computer readable transmission media" that may also participate in the provision of software, application programs, instructions and/or data to the printer 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the printer 101 and the ADGC application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises the read only memory (ROM) 160 and the random access memory (RAM) 170. The processor 105 is able to execute the application programs 133 stored in one or both of the connected memories 160 and 170. When the printer 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instructions or in a separate location 164 within the ROM 160 or the RAM 170.

In general, the processor 105 is given a set of instructions, which are executed therein. This set of instructions may be organised into blocks, which perform specific tasks or handle specific events that occur in the printer 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the printer 101.

The execution of a set of the instructions may require numeric variables to be read and modified. Such numeric variables are stored in the RAM 170. The disclosed ADGC method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in the ROM 160 or the RAM 170 of the next instruction to be executed. At the start of the fetch execute cycle, the content of the memory address indexed by the program counter is loaded into the control unit 151. The instruction thus loaded controls the subsequent operation of the processor 105, causing for example, data to be loaded from the ROM memory 160 into the processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the ADGC methods described below is associated with one or more segments of the application program 133, and is performed by repeated execution of a fetch-execute cycle in the processor 105 or similar programmatic operation of other independent processor blocks in the printer 101.

The ADGC methods may alternatively be implemented in dedicated hardware such as one or more gate arrays and/or integrated circuits performing the ADGC functions or sub functions. Such dedicated hardware may also include graphic processors, digital signal processors, or one or more microprocessors and associated memories. If gate arrays are used, the process flow charts in FIGS. 4, 5, 9, 12, 15 and 19 are converted to Hardware Description Language (HDL) form. This HDL description is converted to a device level netlist that is used by a Place and Route (P&R) tool to produce a file which is downloaded to the gate array to program it with the design specified in the HDL description.

Inkjet Printer and Print Head

Figure 2:
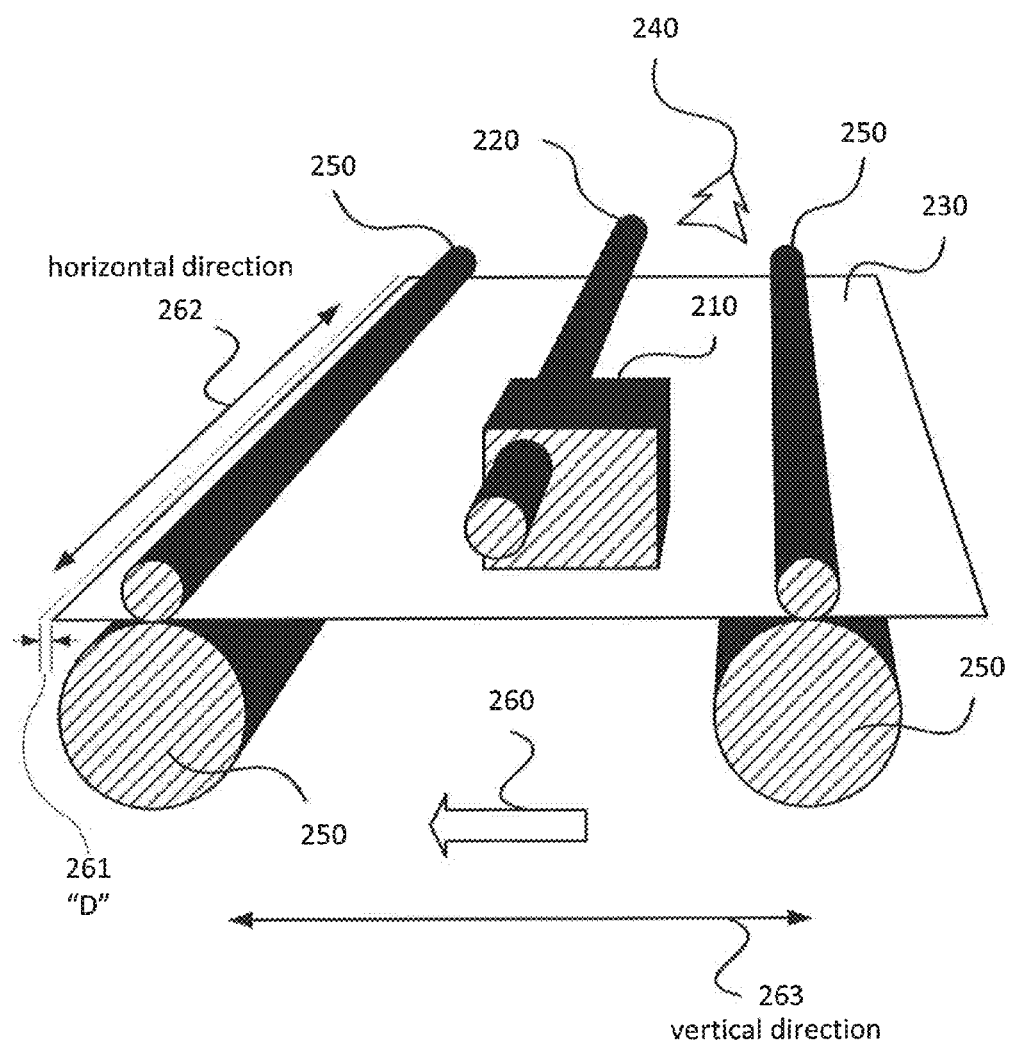
FIG. 2 depicts a simplified representation of the mechanical layout of an inkjet printer with a moving printing head.

FIG. 2 illustrates a simplified representation of the internal arrangement of an inkjet printer. The arrangement comprises a print mechanism comprising a print head 210 having ink ejection nozzles (not illustrated) organised into banks (also referred to as groups) based on colour and/or ink volume. It will be appreciated that in some configurations, the print mechanism may incorporate more than one print head. The print head 210 is mounted on a carriage 220 which transverses a print medium 230 (which may also be referred to as a substrate) and forms image swaths during either or both of a forward passage in a scan direction 240, and a reverse passage opposite to the scan direction 240, by controlling the ejection of ink from the ink ejection nozzles within the nozzle banks. The scan direction 240 is, as depicted by an arrow 262, referred to as being in the "horizontal" direction. The inkjet printer further comprises a print medium advance mechanism 250, which transports, in discrete distance increments D, the print medium 230 in a direction 260 perpendicular to the print head scan direction 240, thereby repositioning the print head relative to the print medium. The scan direction 260 is, as depicted by an arrow 263, referred to as being in the "vertical" direction. The discrete distance increment D, depicted by a reference numeral 261, that the print medium is advanced by the print medium advance mechanism 250 is called the "line feed distance". Two distinct line feed distances are referred to in this description, namely a "design" line feed distance $D^d$ and an "actual" line feed distance LF.

System Overview

Figure 3:
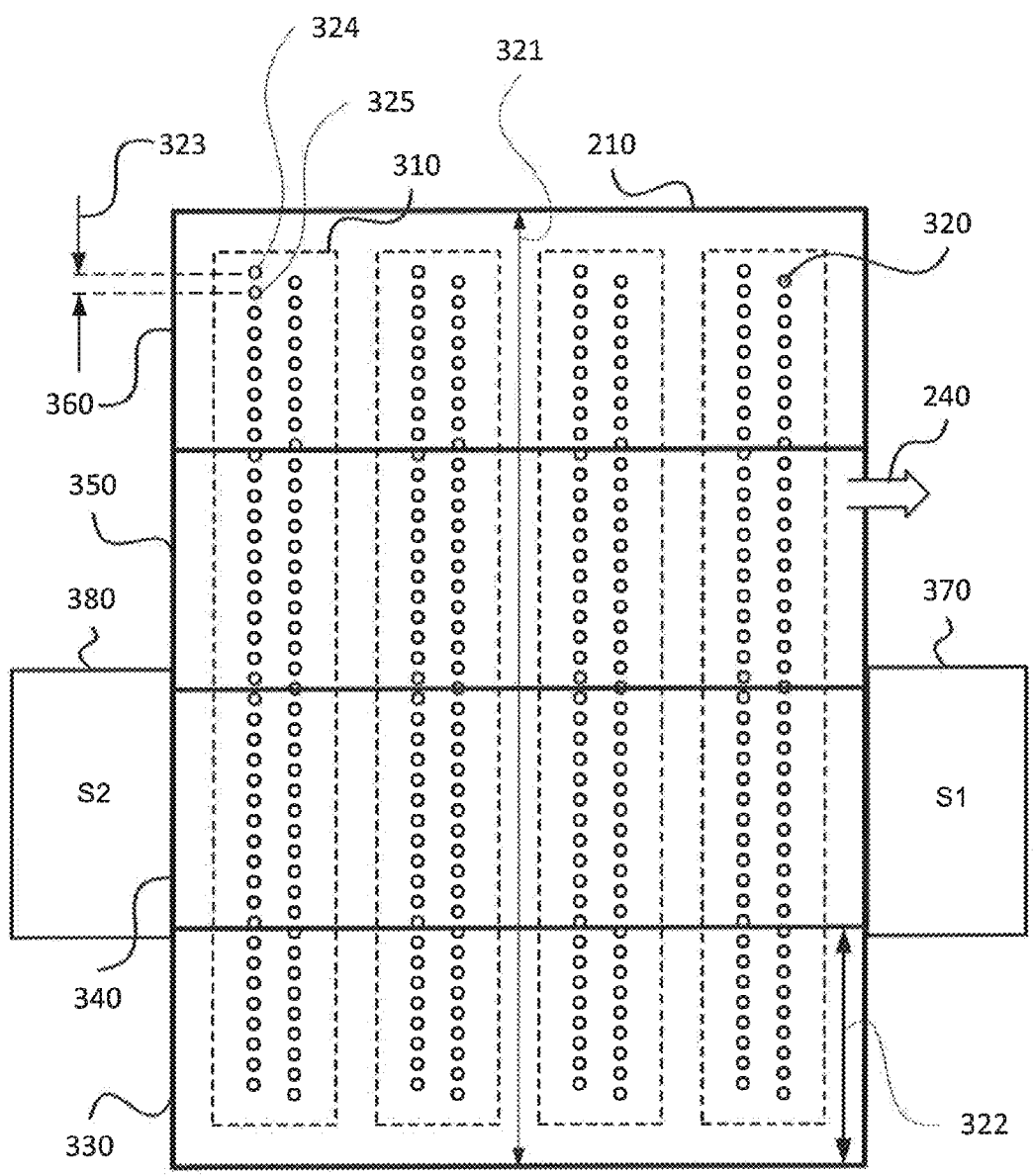
FIG. 3 depicts a layout of an inkjet print head and associated sensors.

FIG. 3 depicts a layout of ink eject nozzle banks, such as 310, of the print head 210. Each nozzle bank 310 consists of multiple ink ejection nozzles such as 320. Horizontal spacing between nozzles, such as nozzles 324 and 325, is depicted by a reference numeral 323. The print head 210 is, in this example, evenly divided along its length 321 into 4 sections 330, 340, 350 and 360, and a section size 322 of each section is pre-determined. Consequently, in the present example the section size of each section is one fourth of a full length 321 of the print head 210.

FIG. 3 also depicts two image sensors S1 and S2. These sensors are attached to the sides of the print head 210, as shown at 370 and 380, respectively. These two image sensors S1, S2 are capable of recording 2-D images. When the print head 210 moves in a direction 240, the sensor S1 acts as a "front sensor" leading the print head and the sensor S2 acts as a "back sensor" trailing the print head. When the print head moves in the opposite direction to 240, the sensor S1 acts as a back sensor trailing the print head and the sensor S2 acts as a front sensor leading the print head. In this example, these two sensors S1 and S2 have the same dimensions and are rectangular in shape. They are located at approximately the same "vertical" position relative to the second quarter 340.

Figure 4:
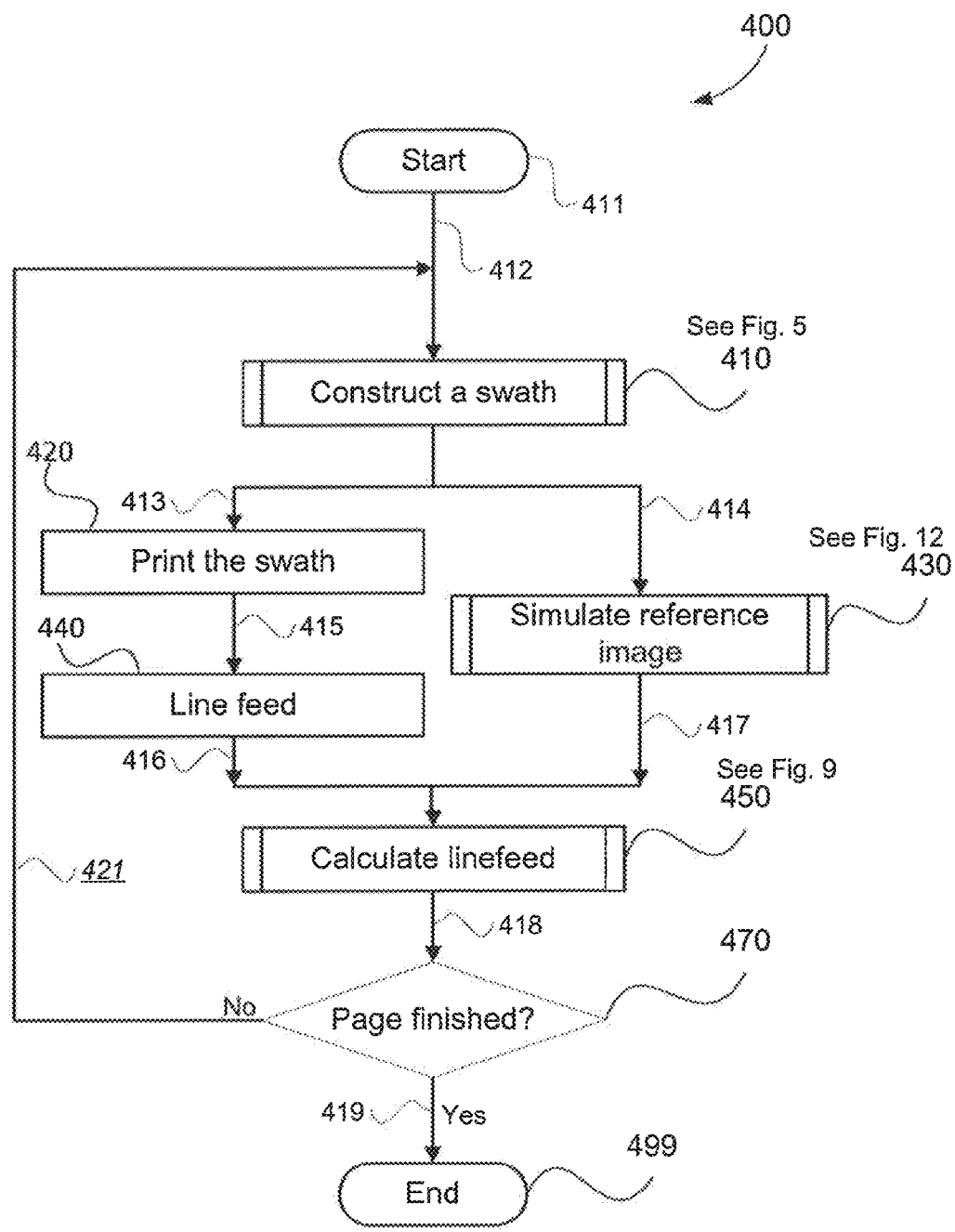
FIG. 4 shows a flow diagram of a process for measuring and calibrating the displacement of the printer head between overprints in a first ADGC arrangement.

FIG. 4 shows a flow diagram of a process for measuring and calibrating the displacement of the printer head between overprints in a first ADGC arrangement and depicts examples of common processes 400 of the ADGC arrangements. The aim of the processes 400 is to measure and calibrate the line feed distance D of a to-be-analysed printer.

Figure 22:
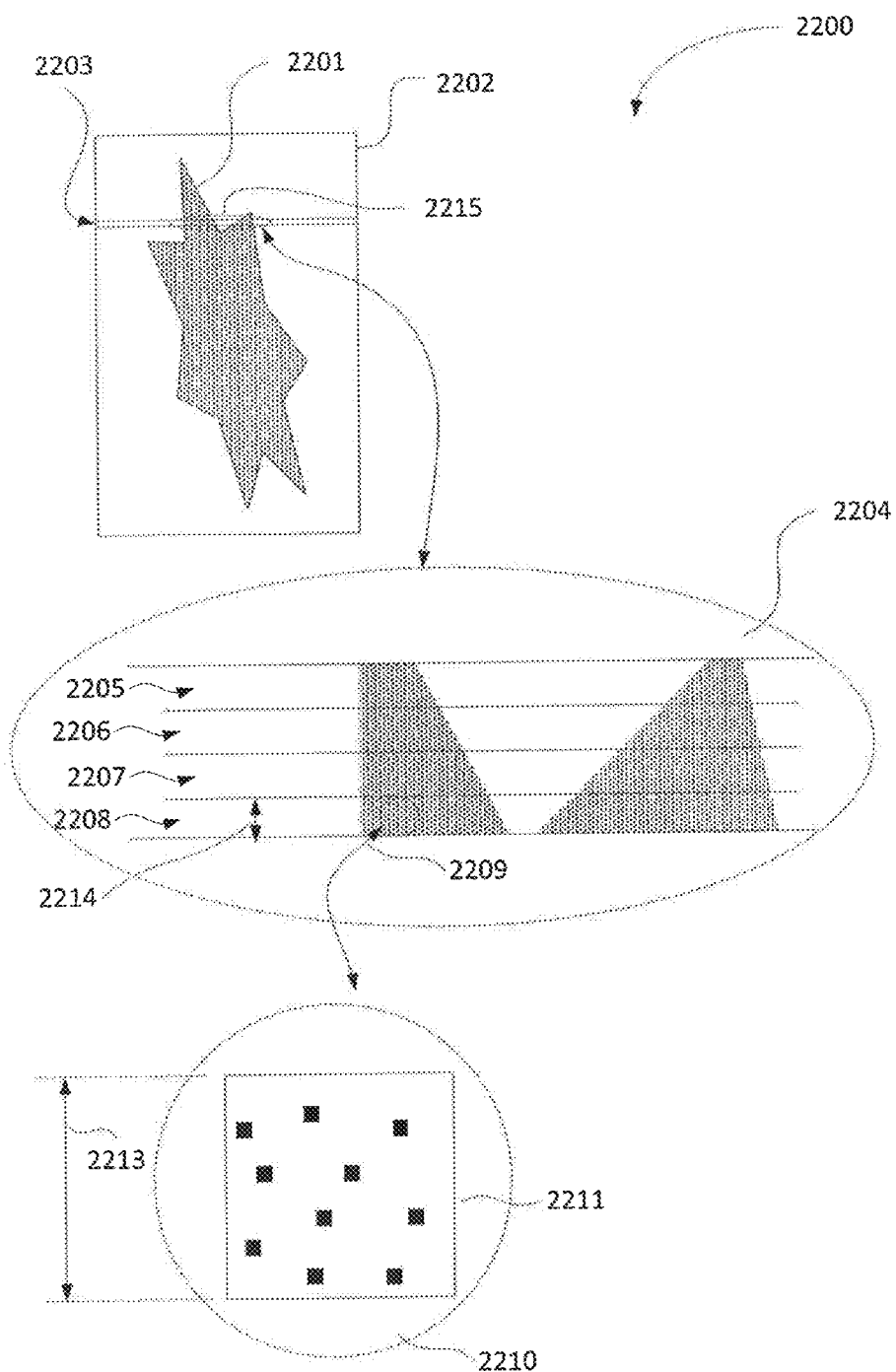
FIG. 22 depicts relationships between the image to be printed on a page, swaths and swath sections into which the image is decomposed.

The process 400 in FIG. 4 is directed, as depicted in FIG. 22, to multi-pass printing of an image 2201 on a page 2202. This is performed by decomposing the image 2201 into swaths 2203 (see also 611 in FIG. 6), the height of the swath 2203 being, in the present example, determined by the height 321 of the print head 210.

Figure 6:
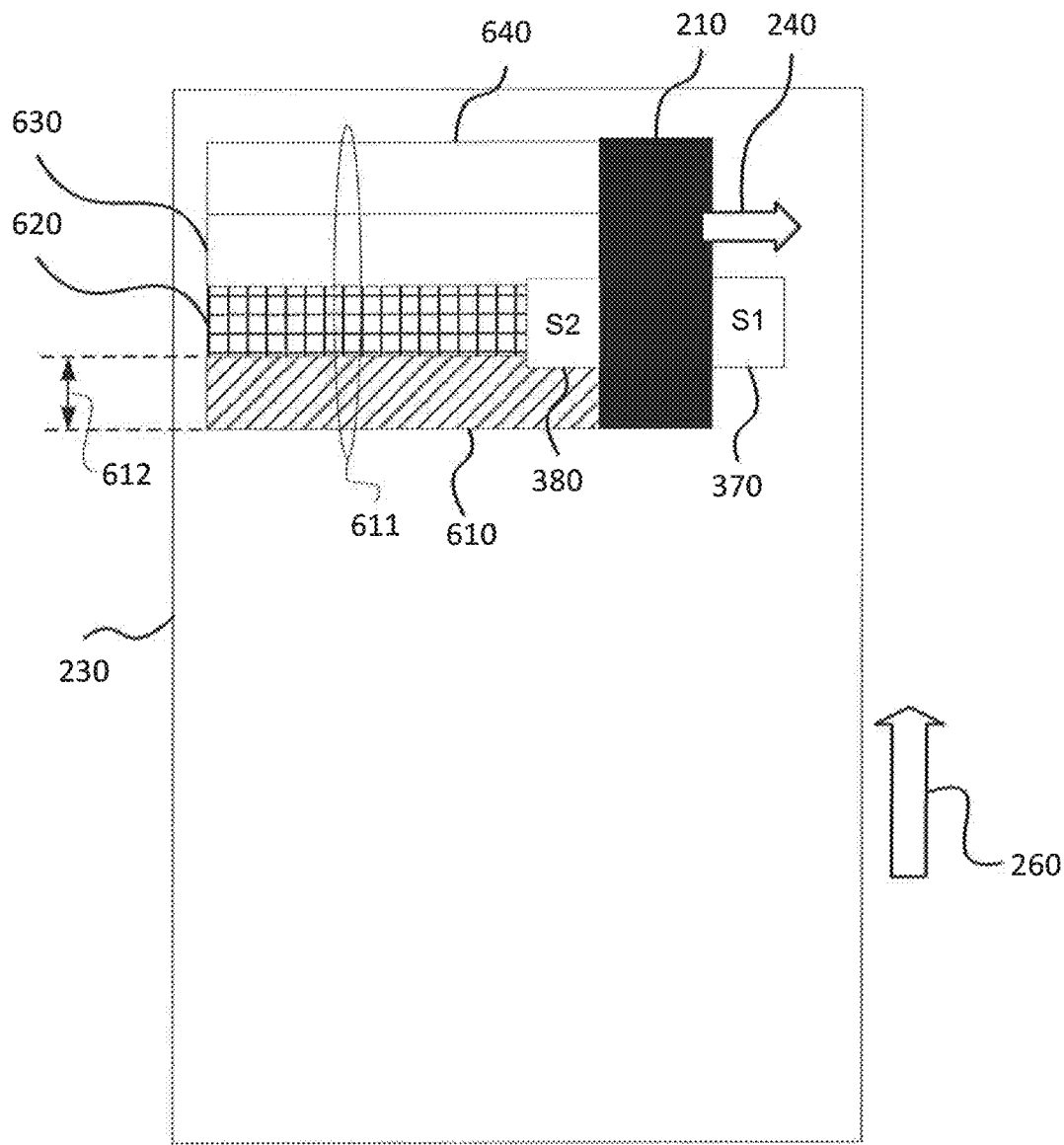
FIG. 6 illustrates the printing process of one overprint.

Each swath 2203 is composed, as depicted by a magnified version 2204 of a portion 2215 of the swath 2203, of four (in the present example) swath sections 2205, 2206, 2207 and 2208 (see also 640, 630, 620 and 610 in FIG. 6). Each swath section such as 2208 is printed by a corresponding print head section such as 330.

The process 400 prints each swath, and then, after displacing the print head by a line feed distance, which is roughly the width 322 of the print head section 330, overprints a printed swath 611 with a subsequent swath 811 (see FIG. 8C) which is displaced by the line feed distance, so that the first printed swath and the subsequently overprinted swath at least partially overlap or are overlaid. As described hereinafter in more detail with reference to FIG. 9, the aforementioned first printed swath can be used, prior to the subsequent overprinting pass, as a real-time transitory test chart that can be used, for example, to determine line feed error.

As described hereinafter in more detail in regard to FIG. 5 "dot patterns" (also referred to as "marks" or "mark patterns") such as 2211 (see also 541 in FIG. 5) are used, in the present example, to print a first printing pass for each individual swath section such as 2208.

As depicted in a magnified version 2210 of a portion 2209 of the swath section 2208, the dot pattern 2211 is used to print the portion 2209 of the swath section 2208 during a first pass. A height 2213 of the dot pattern 2211 is, in the present example, the same height as a height 2214 of the swath section 2208. As described hereinafter in more detail with reference to FIG. 5, the swath section 2208 is overprinted, by displacing the print head by a line feed distance after each printing pass, with pseudo-noise dot patterns using print head sections 340, 350 and 360 for second, third and fourth printing passes, respectively.

Returning to FIG. 4, following an arrow 412 from a START step 411, a step 410, described hereinafter in more detail in regard to FIG. 5, receives, via a file stored on the portable storage medium 125 which is read by the portable memory interface 106, or via a file received over the network 120, a continuous tone (also referred to as a "con-tone") original image 500 which is to be printed on a print medium 230. The step 410 constructs, using the processor 105 directed by the application program 133, a halftoned swath image. This halftoned swath image is then printed in a subsequent step 420, using the print engine 110 directed by the processor 105 directed by the application program 133, to form what is referred to hereinafter as a "printed image".

Figure 8A:
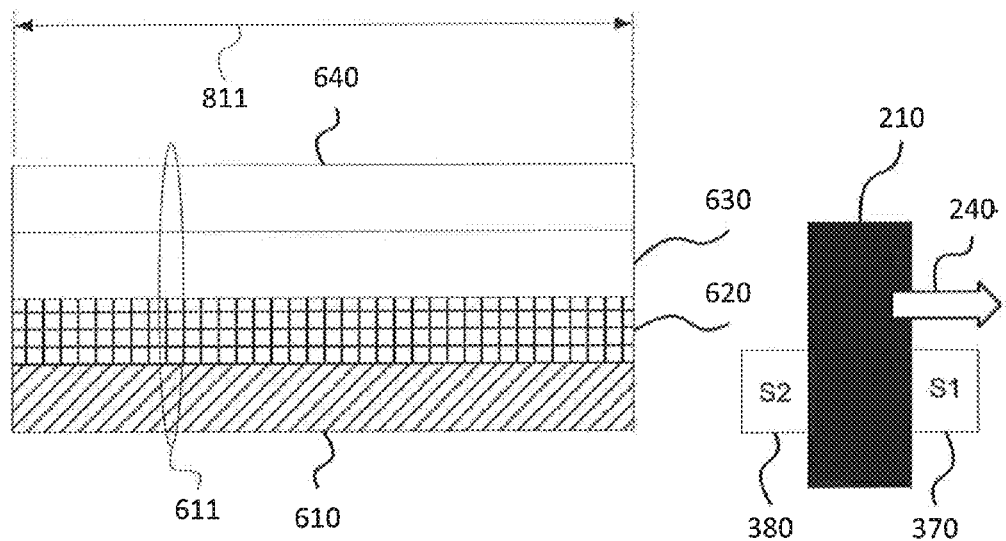
FIGS. 8A, 8B and 8C depict relative positions of the overprints and the print head after a line feed.
Figure 8B:
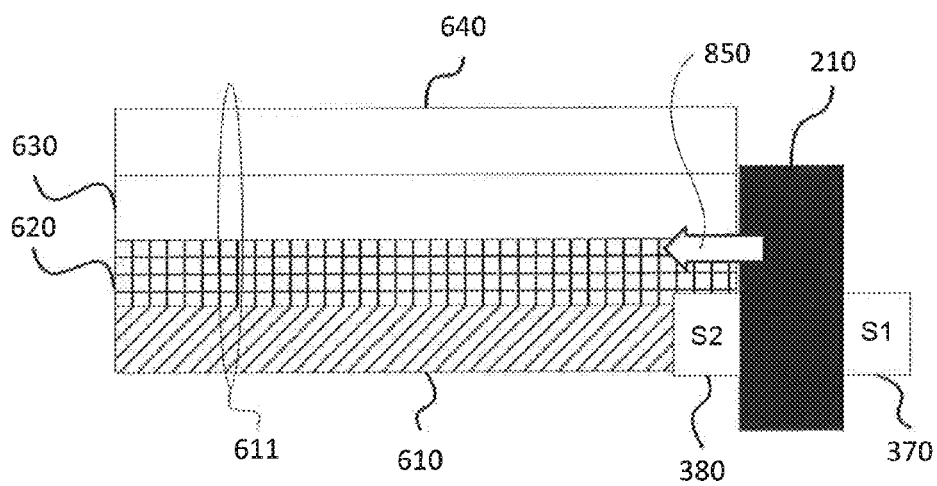

A partly printed swath 611 produced by printing the swath image generated in the step 410 is depicted in FIG. 6. The swath section 610 is printed as a first printing pass over a region 612 by the print head section 330. The lowest section 610 of the four-section swath 611 depicted in FIG. 6 is then overprinted three times, each time by a different section of the print head (e.g. 340, 350 and 360), as the print head traverses, firstly to the left (a second printing pass by the print head section 340) as depicted in FIG. 8B after one line feed increment, then to the right (a third printing pass by the print head section 350) after a further line feed increment, and finally to the left (a fourth printing pass by the print head section 360) after a further line feed increment. As a result, the region 612 is overprinted with four layers of pseudo-noise dot patterns, the four layers of pseudo-noise dot patterns representing the corresponding region in the con-tone original image 500.

FIG. 6 depicts the printing process of one overprint, depicting an example of a printing process where the print head 210 moves in the direction 240. In FIG. 6, the print medium is associated with the reference numeral 230. The print head 210 and the two sensors 370 and 380 are shown in the middle of a current swath 611. A reference numeral 610 depicts a part of a printed image or a swath section that is printed by the first quarter 330 of the nozzle bank 310 (i.e. the first section of the nozzle bank 310). A reference numeral 620 depicts a part of the printed image or swath section that is printed by the second quarter 340 of the nozzle bank 310 (i.e. the second section of the nozzle bank 310), and so on.

Referring back to FIG. 4, following an arrow 415, in a following step 440, the advance mechanism 250 transports the print medium 230 in the direction of the arrow 260 by one line feed distance D. The design line feed distance $D^d$ in this example is specified to be approximately equal to the section size 322. The step 440 thus re-positions the print medium 230 so that thereafter, the current positions of the previously printed swath 611 and the print head 210 are depicted in FIG. 8A. Note the change in the vertical position of the print head relative to the position in FIG. 6.

Referring back to FIG. 4, it is noted that the first step 410, described hereinafter in more detail in regard to FIG. 5, constructs a halftoned swath image.

Figure 5:
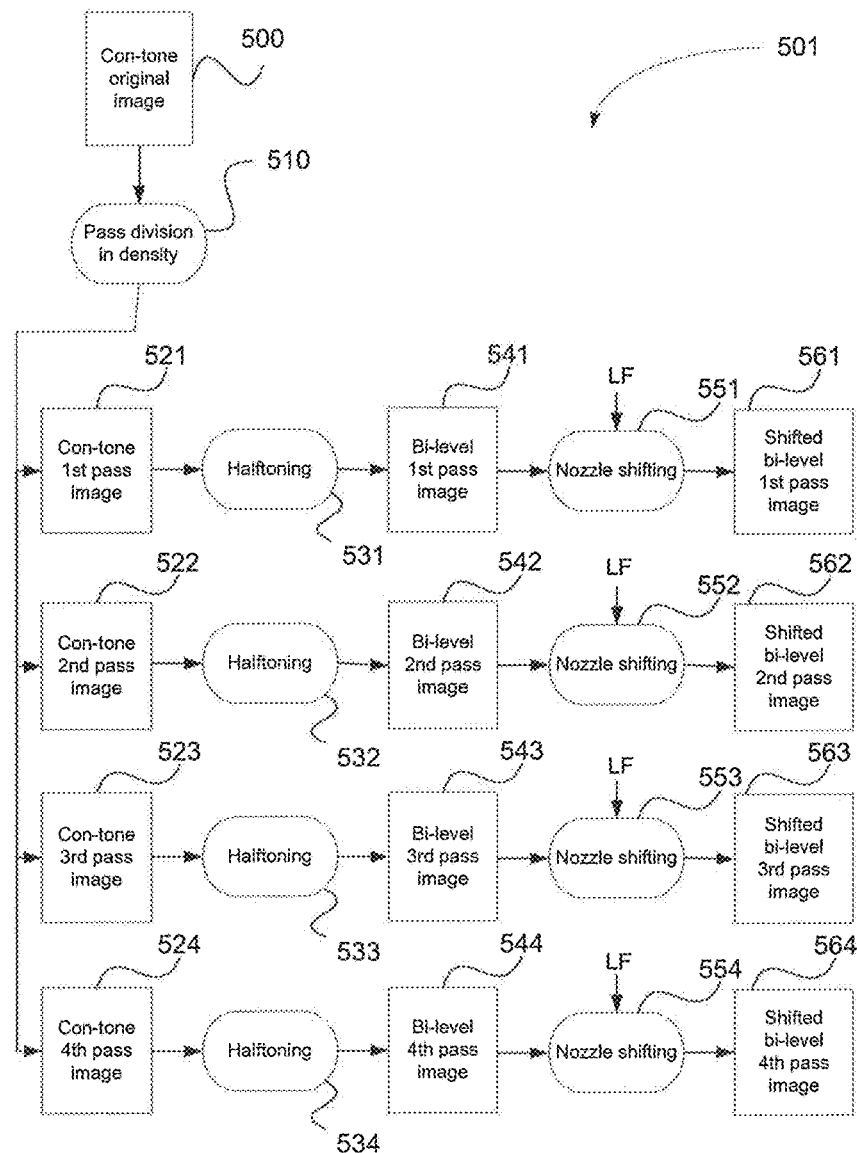
FIG. 5 shows a flow diagram of the swath construction process of FIG. 4.
Figures 23A, 23B, 23C, 23D:
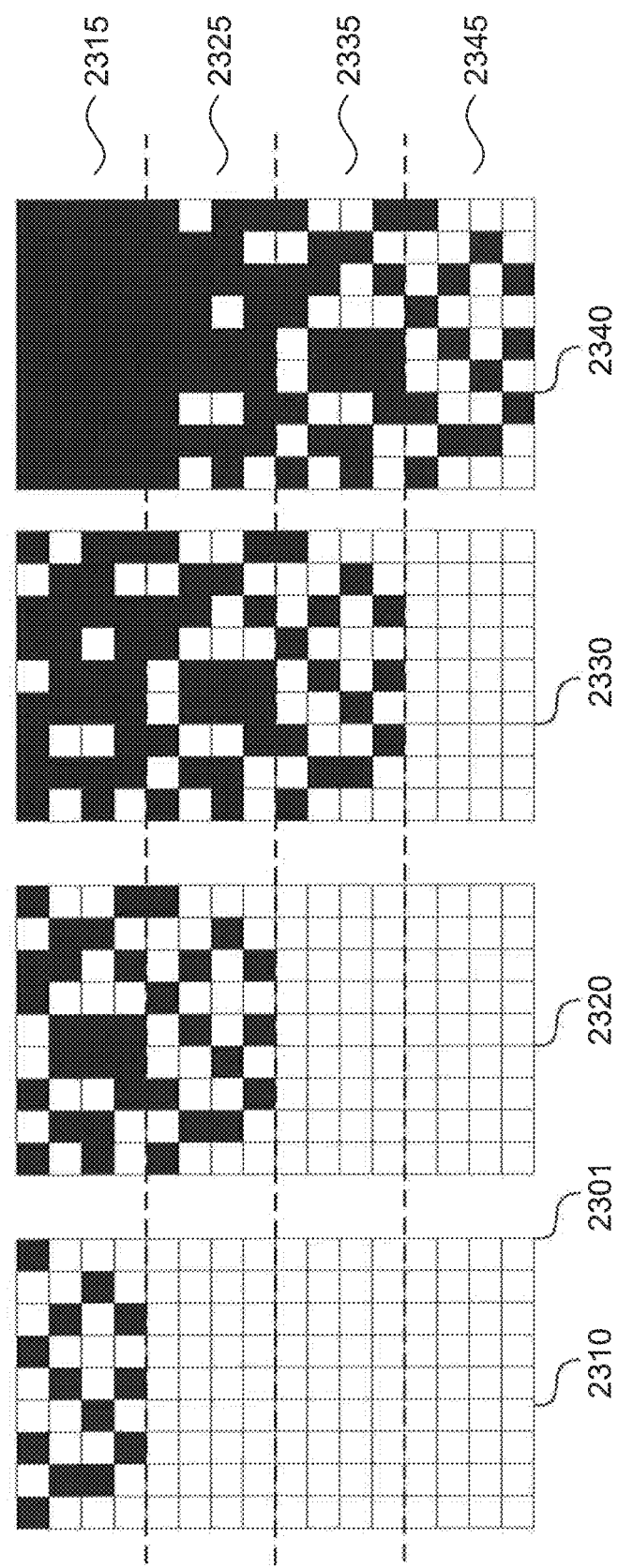
FIGS. 23A-23D illustrate a four-pass printing process.

FIG. 5 shows a flow diagram of the swath construction process 410 of FIG. 4, and shows an example of a process 501 for implementing the step 410. The process 501 produces $1^{st}$, $2^{nd}$, $3^{rd}$ and $4^{th}$ pass swath section images each time the process is performed. An example of a $1^{st}$ pass swath section is depicted at 2310 in FIG. 23A.

FIGS. 23A-23D illustrate a four-pass printing process example, in which a swath has four evenly divided sections which have the same height as sections 2315, 2325, 2335 and 2345 of a print medium 2301. When the print head 210 travels over the section 2315 of the print medium 2301 for the first time, a $1^{st}$ pass swath section image for the section 2315 is printed, resulting in an intermediate printout 2310. This is followed by a line feed, which effects a relative movement between the print head 210 and the print medium 2301 by a quarter of the print head height 321. This allows the print head 210 to travel and print across the section 2325 for the first time and across the section 2315 for the second time, resulting in an intermediate printout 2320. A further line feed is executed, allowing a $1^{st}$ pass swath section image to be printed over the section 2335, a $2^{nd}$ pass swath image over the section 2325 and a $3^{rd}$ pass swath image over the section 2315 as depicted at 2330. Printing continues in this fashion until each print medium section (2315, 2325, 2335 and 2345) is overprinted four times, e.g. the section 2315 as depicted at 2340. For an N multi-pass printing system, the print medium 2301 is partitioned into sections each with a height equal to 1/N of the print head height 321, and each section is overprinted N times. Based on the example in FIGS. 23A-23D, the bi-level $1^{st}$ pass image 541 consists of the $1^{st}$ pass swath section image for section 2315 at 2310, the $1^{st}$ pass section image for section 2325 at 2320, the $1^{st}$ pass section image for section 2335 at 2330, and the $1^{st}$ pass section image for section 2345 at 2340.

Returning to FIG. 5, firstly, the original continuous-tone image 500 of the swath in question is divided into, in this example, 4 printing passes by a step 510.

The step 510 is performed in a continuous-tone domain, and therefore the divided passes 521, 522, 523 and 524 are continuous-tone as well.

In the present example, subsequent steps 531, 532, 533 and 534 apply halftoning to the con-tone pass images 521, 522, 523 and 524, resulting in bi-level halftone images 541, 542, 543 and 544, respectively. The con-tone pass images 521, 522, 523 and 524 may be swath section size regions of the con-tone original image 500. The halftoning steps 531, 532, 533 and 534 can be implemented based on common algorithms such as blue noise masking or error diffusion.

Figure 16:
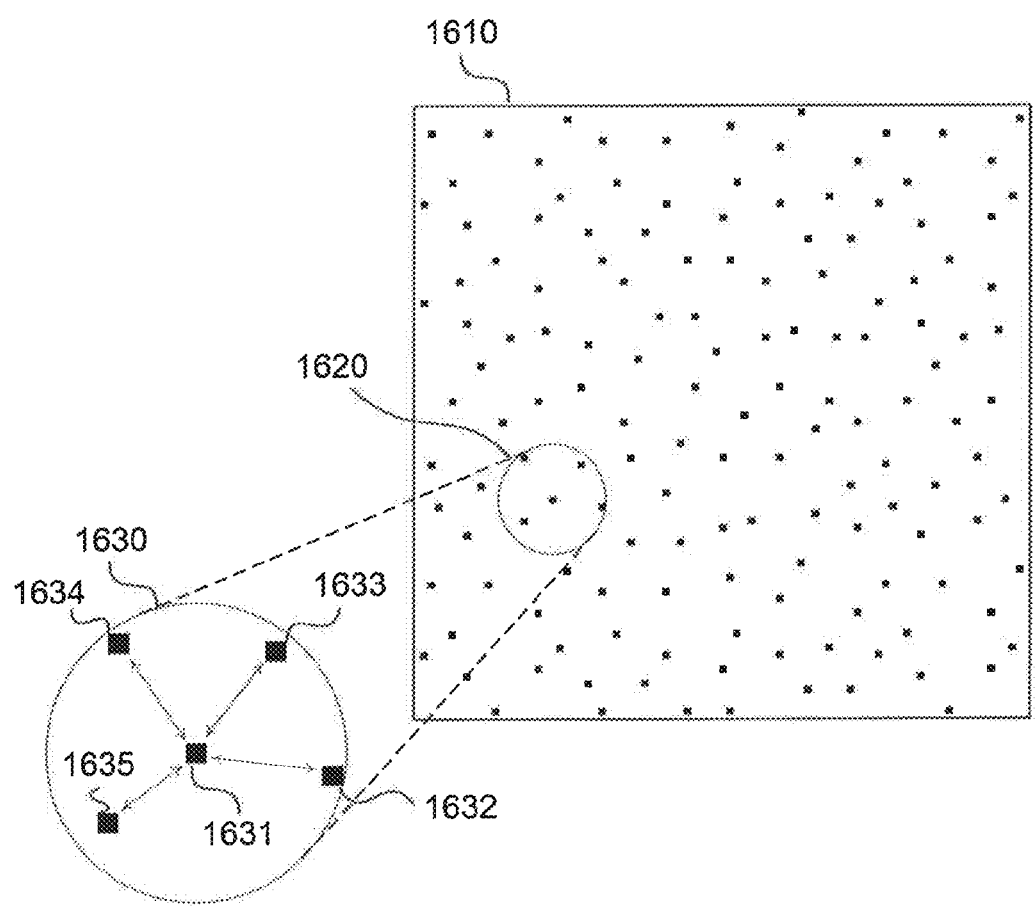
FIG. 16 shows an example of a tile in a first ADGC arrangement and a magnified section thereof.

FIG. 16 shows an example of a tile in a first ADGC arrangement and a magnified section thereof, showing an example tile region 1610 of the output pattern 541 generated in this manner and a magnified view 1630 of an area 1620. The dot pattern 1610 is a uniform distribution of pseudo-noise dots. The zoomed (ie magnified) view 1630 of the region 1620 in the halftone pattern 1610 contains halftone dots 1631, 1632, 1633, 1634 and 1635. The locations of these dots and the spacing between them correspond to a density value of the con-tone image 521, such that a high-density con-tone image 521 will have low dot spacing (i.e., the spacing between the dots in 1630 will be small), while a low density con-tone image 521 will have high dot spacing (i.e., the spacing between the dots will be large).

Returning to FIG. 5, the following steps 551, 552, 553 and 554 perform nozzle shifting according to the measured error of line feed (from a step 450 in FIG. 4) to compensate for any discrepancy between the actual line feed distance LF and the design line feed distance $D^d$. For example, if the actual line feed distance LF is approximately two pixels longer than the design line feed distance $D^d$, then the steps 551, 552, 553 and 554 shift the images 541, 542, 543 and 544 by two pixels upward respectively, resulting in shifted dot patterns to be printed 561, 562, 563 and 564. With reference to FIG. 2, a line feed that is two pixels longer than the design line feed distance $D^d$ means the print head 210 is two pixels below its ideal position relative to the print medium 230 in the vertical direction 263. It further means that any dot pattern printed by the print head 210 at this vertical location will be two pixels lower than its intended location. In order to compensate for this misalignment, the swath image consisting of sections of 541, 542, 543 and 544 must be offset by the misalignment distance i.e., two pixels. Offsetting the images 541, 542, 543 and 544 upward by two pixels has the effect causing ink ejection to begin from two nozzles higher, thereby cancelling out any misalignment caused by the extra line feed distance 261. Each dot pattern 561, 562, 563 and 564 is then combined with different print passes of neighbouring regions to construct final swath data which has a height 321 equal to that of the print head.

Referring back to FIG. 4, in conjunction with performing the swath printing step 420 and the line feed advancing step 440, following an arrow 414 from the step 410 a reference image simulation step 430, described hereinafter in more detail in regard to FIG. 12, generates a digital reference image 870 (see FIG. 8C) of the swath section 610, referred to hereinafter as a simulated reference image or merely as a reference image. This digital reference image can be stored in memory 109 for use in printer calibration and measuring print quality.

The reference image is made up of simulated dots, and is derived from the 1$^{st}$ pass dot pattern 561, and represents the intended 1$^{st}$ pass image to be printed. As described above with reference to FIGS. 6, 8A, 8B and 8C, the swath section 610 is the lowest of the four-section swath image 611, and is printed by the lowest quarter 330 of the print head 210. Ideally, the reference image should be derived from the 1$^{st}$ pass dot pattern 561, as it would allow any line feed misalignment to be corrected prior to additional passes being printed. However, the ADGC arrangements are not limited to using reference images derived from the 1$^{st}$ pass dot pattern. Further, the perceived density of the reference image should be higher than the perceived density of the printed image The swath section 610, comprising pseudo-random inkjet dots (see 720 in FIG. 7B), is the first print pass across the region 612 on the print medium 230. The reference image 870 comprises a simulation of the dot pattern that is actually printed in the swath section 610. The simulation is determined using a model of the print (see 420) and capture (see 910) processes (hereafter referred to as a "print/scan model" or merely as a "model"). The model uses a set of parameters to transform the bi-level halftone dot pattern 561 to the reference image 870 which represents the ideal expected output of a print (see 420) and scan (see 910) process. The print/scan model may include many smaller component models such as modelling the effect of individual nozzle dot placement error, blocked nozzles, blurring introduced and caused by the sensors 370 and 380, background noise, and various other distortions.

The reference image 870 is useful for printer calibration and measuring print quality. Specifically, the reference image 870 may be used for measuring line feed errors, colour registration errors, print head tilt errors, blocked nozzles, etc. These measurements may involve comparing dot patterns in the reference image 870 to captured images of actual printed dot patterns in the swath section 610.

Figure 8C:
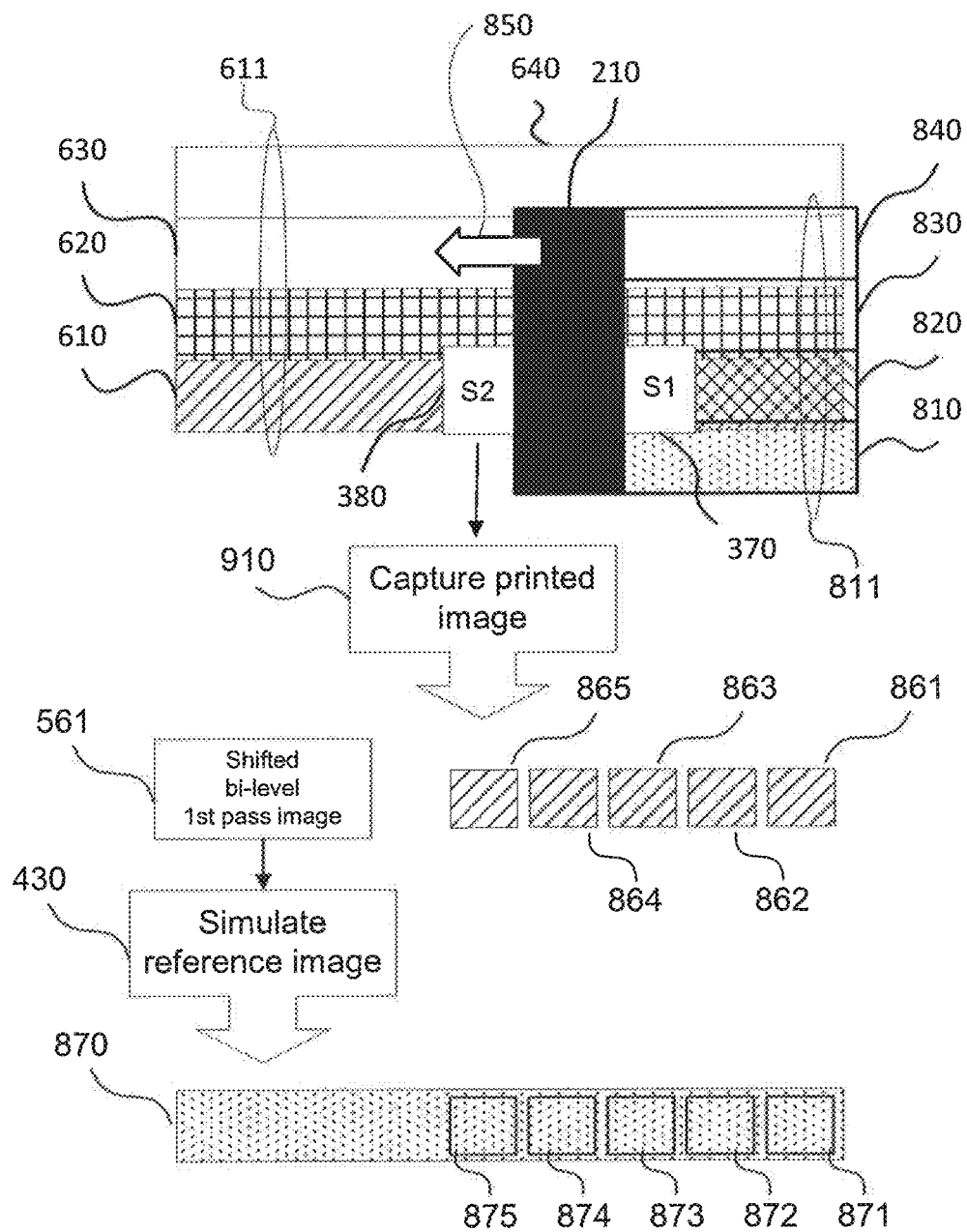

FIG. 8C further shows that the reference image 870 may be partitioned into a number of smaller reference image tiles 871, 872, 873, 874 and 875, such that the reference tiles 871, 872, 873, 874 and 875 correspond to respective image tiles 861, 862, 863, 864 and 865 of printed dot patterns that are captured by the sensor 380. Alternatively, the reference image simulation step 430 may generate one or more of the reference image tiles 871-875 directly without generating the reference image 870 first. Accordingly, the reference image may correspond to the entire print medium on which the dots are to be printed or to only a part of the print medium.

Figure 7A:
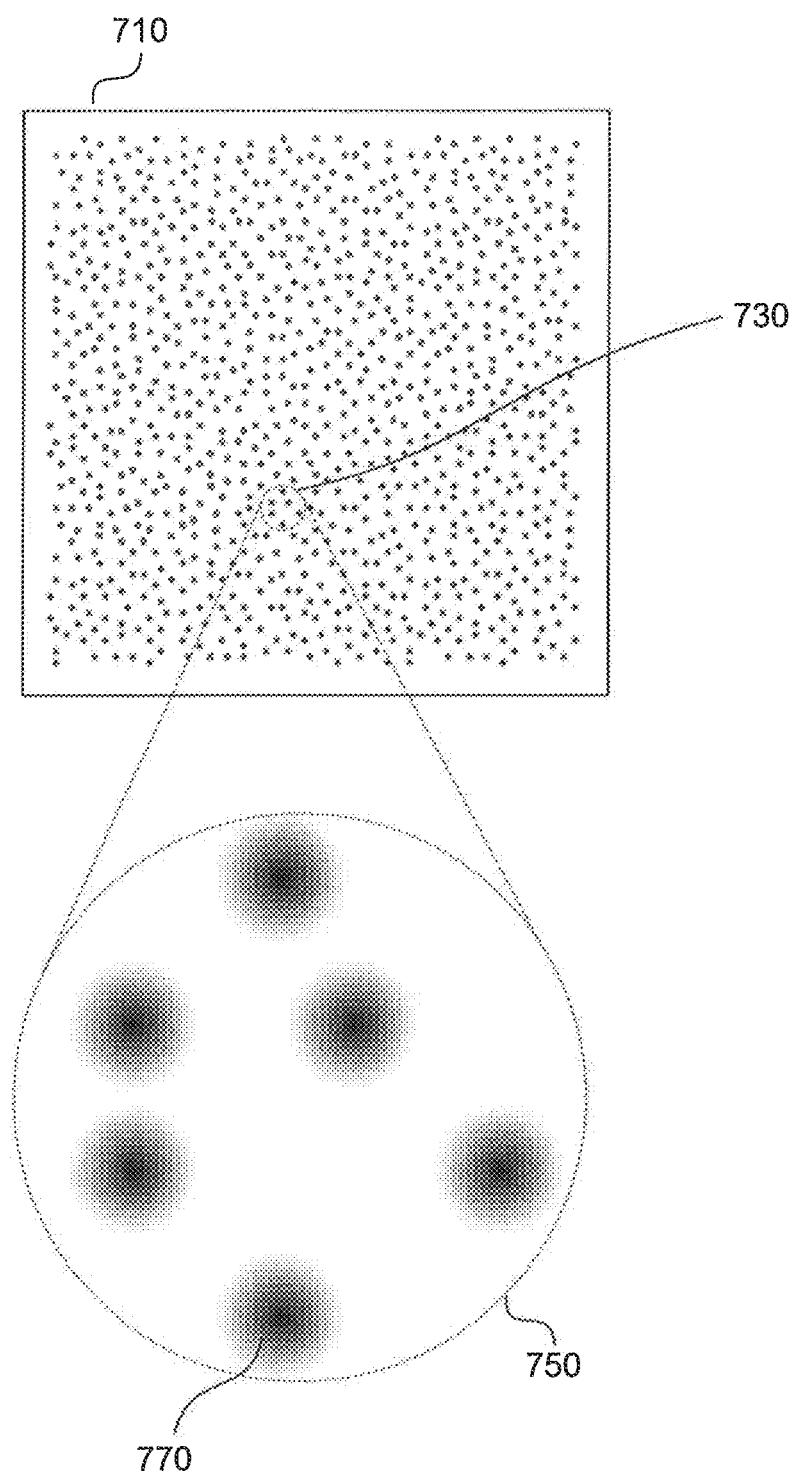
FIGS. 7A and 7B provide a comparison of printed inkjet dots and simulated dots.
Figure 7B:
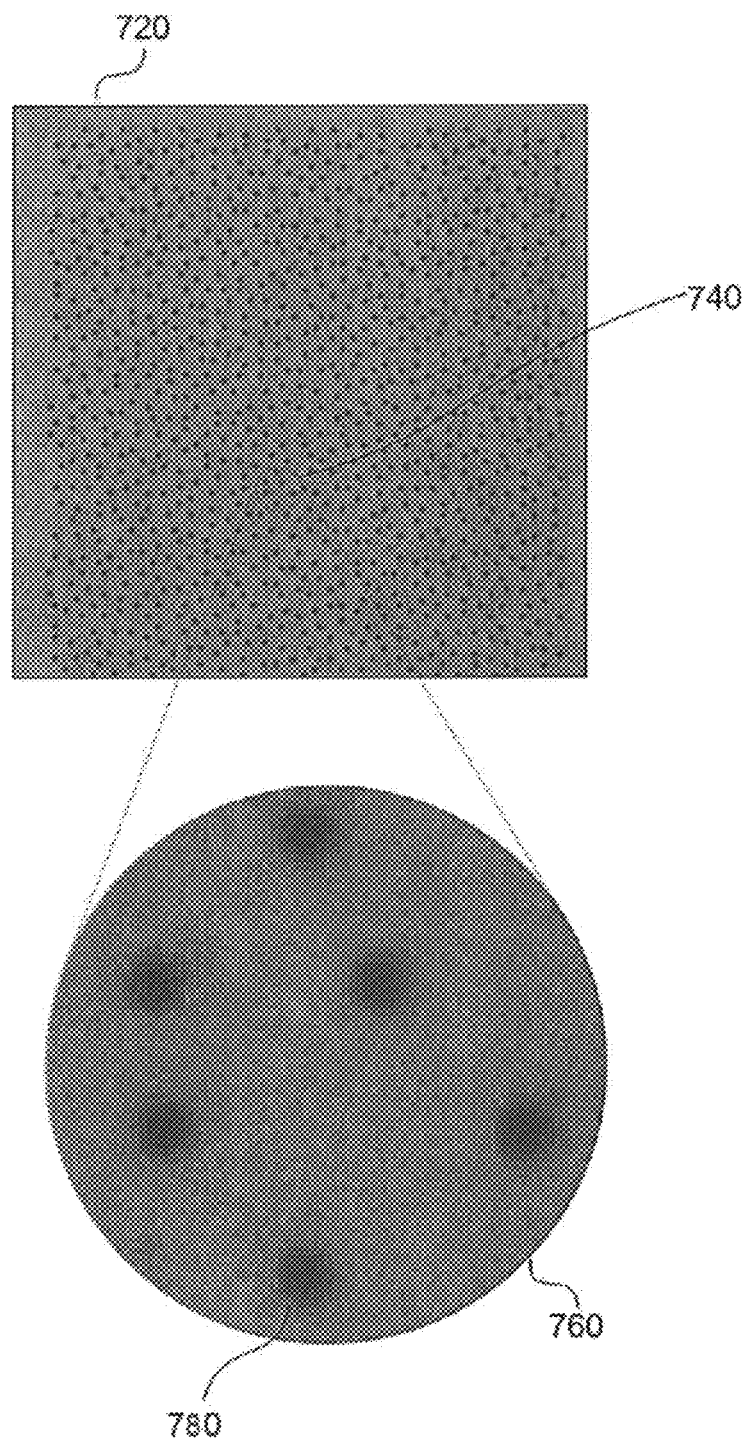

FIGS. 7A and 7B provide a comparison of printed and captured inkjet dots in the printed document produced by the steps 420 and 910, and simulated dots in the reference image produced by the step 430. FIGS. 7A and 7B show an example reference image tile 710 and an example of a captured tile 720. The reference image tile 710 is a simulation of the captured tile 720, based on the bi-level halftone image 561. FIG. 7A further shows a magnified version 750 of a corresponding region 730 in the reference tile 710. The magnified region 750 contains simulated inkjet dots 770 corresponding to the dots that have been printed and captured in a magnified region 760. A magnified version 760, containing real printed and captured inkjet dots 780, of a corresponding region 740 in the printed and captured tile 720 is also shown in FIG. 7B.

Figure 11:
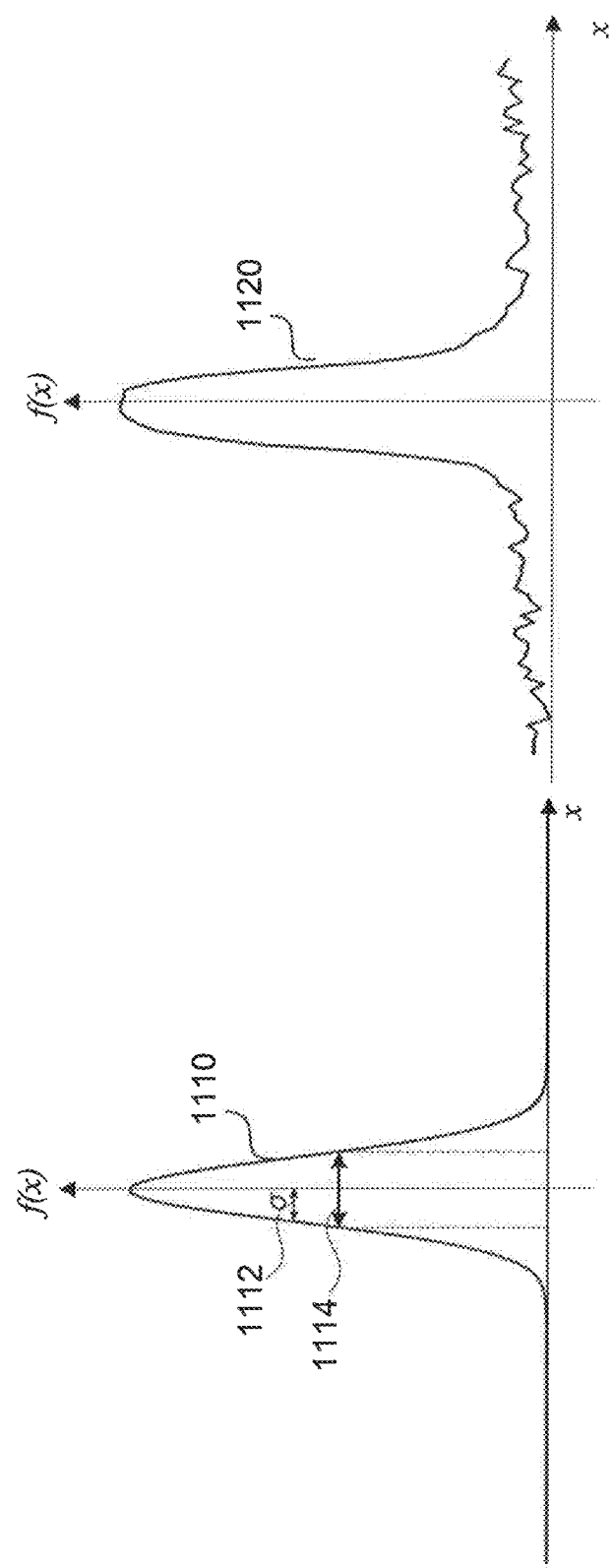
FIGS. 11A and 11B show magnitude profiles for a captured/printed inkjet dot and a simulated dot.

A printed inkjet dot generally appears as a solid circular disc. When captured by an imaging system, the captured dot becomes distorted by the point-spread function of the system. As a result, some blurring of the dot is typically expected. The effect of this blurring is depicted in FIG. 11B, which shows a magnitude profile of a captured inkjet dot at 1120. The captured dot profile 1120 may be modelled in the spatial domain using a circular Gaussian function as follows:

$$f(x, y) = Ae^{-\left(\frac{(x-x_o)^2}{2\sigma^2} + \frac{(y-y_o)^2}{2\sigma^2}\right)}$$

where f(x,y) is a 2D function, A is the amplitude of the circular Gaussian function, $(x_o, y_o)$ is x-y coordinate of the centre of the dot, and σ is the spread in pixels for both x and y directions. The result of simulating a reference image dot as a simulated Gaussian dot is shown at 1110 in FIG. 11A. Thus, a reference image 870 (see FIG. 8C) for the bi-level halftone pattern 561 may be simulated in the step 430 according to one model which uses the parameters A, $x_o$, $y_o$ and σ. Alternatively, the simulation step 430 may include additional parameters for modelling individual dot placement errors, dot contrast, blocked nozzles, inkjet drop satellites, background level and noise, sensor noise, and any other measureable printer and scanner characteristics.

The parameter σ, shown at 1112 in FIG. 11A, controls the size of each simulated inkjet dot in the reference image 870 (hereafter referred to as the "simulated dot size" or merely as the "dot size"). With Gaussian dots, there are no sharp edges to accurately define the diameter of a simulated dot. A parameter 1114 called the Full Width at Half Maximum (FWHM) may be used to describe the approximate diameter of a Gaussian dot and the FWHM is related to the dot size σ as follows:

$$\text{FWHM} = 2\sqrt{2\ln 2}\sigma \approx 2.35\sigma$$

Dots in the reference image 870 may be grown to various sizes by appropriate selection of the parameter σ. However, in the ADGC arrangements the simulated dot size is limited by the spacing between adjacent dot locations in the bi-level halftone image 561. With reference to FIG. 16, an example of an image tile in the bi-level halftone image 561 is shown at 1610. The image tile 1610 contains a uniform distribution of pseudo-noise dots, which may be generated using common algorithms such as blue noise masking or error diffusion. FIG. 16 further shows the magnified region 1630 of the region 1620 in the bi-level halftone image 1610. Each halftone dot corresponds to a 2D coordinate location where an ink droplet ejection is expected. For a given halftone dot 1631, its simulated dot size in the reference image 870 may need to satisfy a predetermined criterion, and in the present example is constrained by the distances between its location and the locations of its nearest neighbours such as halftone dots 1632, 1633, 1634 and 1635. These centre-to-centre distances define corresponding dot spacing values between halftone dots. The dot spacing values may be used to define a suitable simulation dot size for any given halftone dot pattern.

For halftone patterns with a uniform distribution of pseudo-noise dots, a dot density value (in percent) may be defined as the number of ink droplet ejections per 100 pixels. Importantly, this is a measure of the number of dots per unit area, and is not dependent upon the size of the dots. For example, a 4% density halftone pattern with a uniform distribution of pseudo-noise will have four printed dots in a hundred pixels. Thus, a known density value of a halftone pattern may also be used to define a suitable simulation dot size. In an alternate arrangement, the bi-level halftone image 561 may be stored as a list of 2D coordinate locations, and simulation dot sizes may be determined based upon the list of coordinate locations.

Referring back to FIG. 4, following an arrow 417 from the step 430, and an arrow 416 from the step 440, a following step 450 determines the actual line feed distance LF, described hereinafter in more detail in regard to FIG. 9. The step 450 can be performed either by using information from the sensor 370 or by using information from the sensor 380. The step 450 can be performed as long as the sensor 370 and/or the sensor 380 are able to capture image(s) of the printed first swath. The actual line feed distance LF is measured by comparing captured image tiles 861-865 to reference image tiles 871-875. This comparison may be based on a correlation technique such as phase correlation or gradient based image alignment methods.

Phase correlation is commonly used in many alignment applications, because it generates very sharp correlation peaks which allows accurate peak interpolation. However performing correlation between images with different levels of blur and distortion may cause anti-correlation which corrupts the resultant correlation peak. This corruption changes the shape and location of the correlation peak, which lowers the correlation accuracy, and in severe cases the correlation peak may give an incorrect shift estimate. The correlation operation in the line feed measurement step 450 performs correlation between a simulated reference image (from the step 430) and a captured image of printed dots (i.e., an image captured from the image printed by the step 420). These two images generally have different levels of blur and distortion. Furthermore, the reference image 870 models the effect of the print and scan process using a Gaussian profile for example, which is an approximation. As a result of these differences between the reference and captured images, correlation accuracy is affected.

Figure 17:
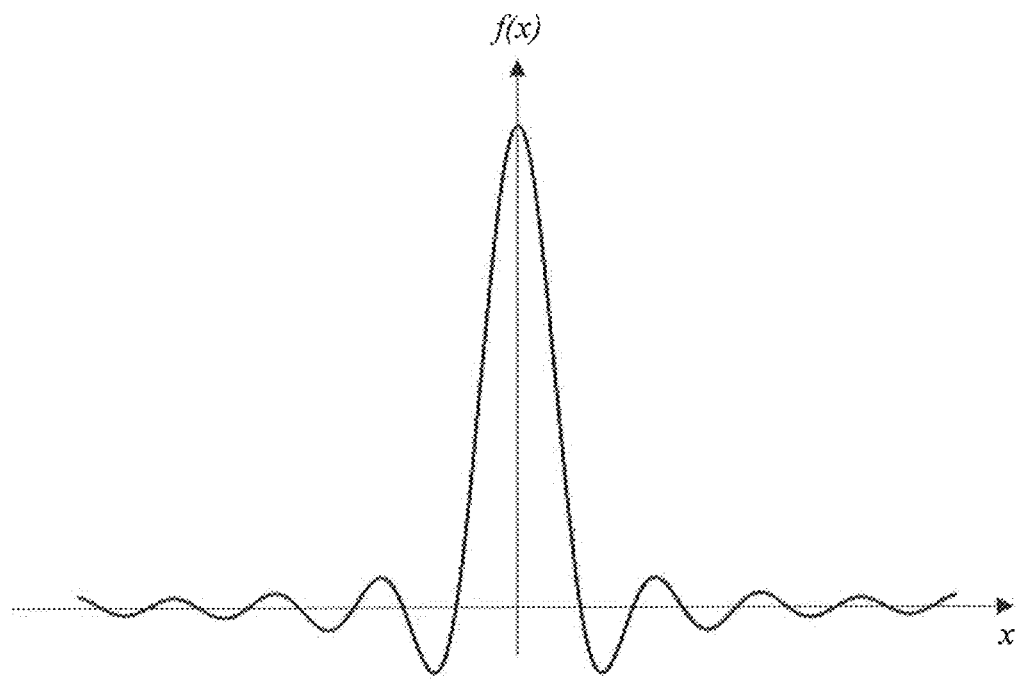
FIG. 17 shows a jinc function profile.
Figure 18:
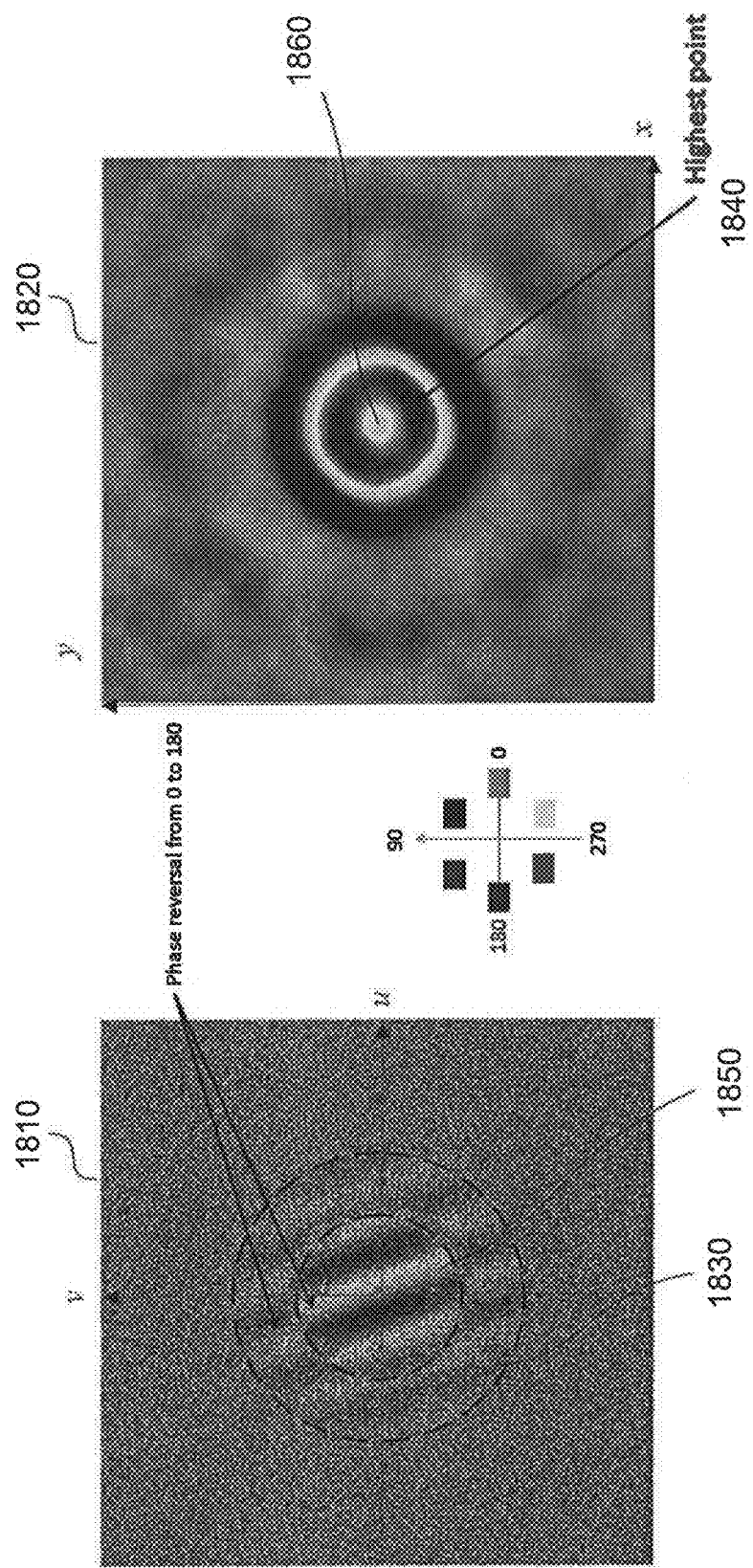
FIGS. 18A and 18B depict the effect of phase reversal in image correlation.

Printed inkjet dots are solid circular discs, which have a Fourier representation with a Jinc function profile (cross section) as shown in FIG. 17. When a printed dot pattern is correlated with a Gaussian dot pattern, the negative side lobes of the Jinc functions in the Fourier domain are 180° out of phase with the Fourier transform of the Gaussian dot. As a result, the cross power spectrum depicted at 1810 in FIGS. 18A and 18B exhibit phase reversal such that the phase in the central lobe 1850 is 180° out of phase with the phase in the side lobe 1830. This phase reversal contributes negatively to the correlation peak 1820, resulting in a corrupted peak that resembles a "volcano", with a centre 1860 having a height that is lower than a surrounding rim 1840. Thus, any peak detection algorithm that relies on detecting the highest point of the correlation peak 1820 would produce an incorrect shift estimate, because it would detect the rim 1840 instead of the peak 1860.

The effect of phase reversal may be reduced by minimising the contribution from the side lobes of the Jinc function. One way of achieving this is to reduce the width of the Fourier transform of the Gaussian dots. Narrowing a Gaussian function in the Fourier domain is equivalent to widening its corresponding Gaussian function in the spatial domain. That is, the phase reversal effect may be reduced by enlarging the simulated dots in the reference image 870.

Figure 9:
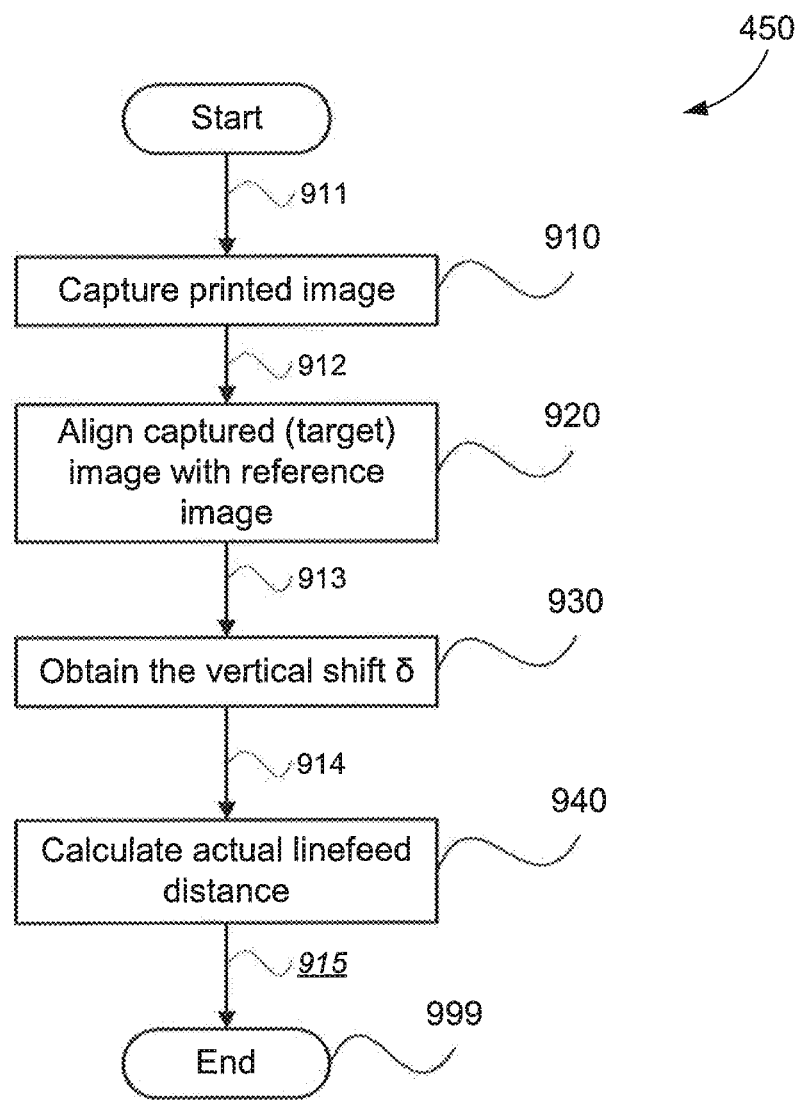
FIG. 9 shows a simplified flow diagram of a process for determining a vertical shift δ.

FIG. 9 shows a simplified flow diagram of a process for determining a vertical shift δ, and depicts a flow chart of a process, described hereinafter in more detail in regard to FIGS. 6, 8C, 10 and 20, for determining the actual line feed distance LF. Following a start step 916, following an arrow 911, when the print head 210 reaches the edge of the printing area (i.e. the edge of the print medium 230) as shown in FIG. 8B, the sensor S2 (ie 380) can start capturing images of the printed swath section 610 in an image capture step 910. This capturing process 910 is further illustrated in FIG. 8C, in which the sensor 380 captures a sequence of image tiles 861, 862, 863, 864 and 865 of printed inkjet dots as it moves from right to left across the print medium 230. The image tiles 861-865 are preferably captured at a resolution of 1200 dpi with a width and height of 192×192 pixels at 8 bit per pixel. Alternatively, the image tiles 861-865 may be captured at a different resolution, with a different window size, and a different bit depth per pixel.

As described above, for every captured image tile 861-865 of printed dots, there is a corresponding reference image tile 871-875 of simulated dots. The relationship between a given pair of reference and captured tiles is further described with reference to FIG. 20.

Figure 20:
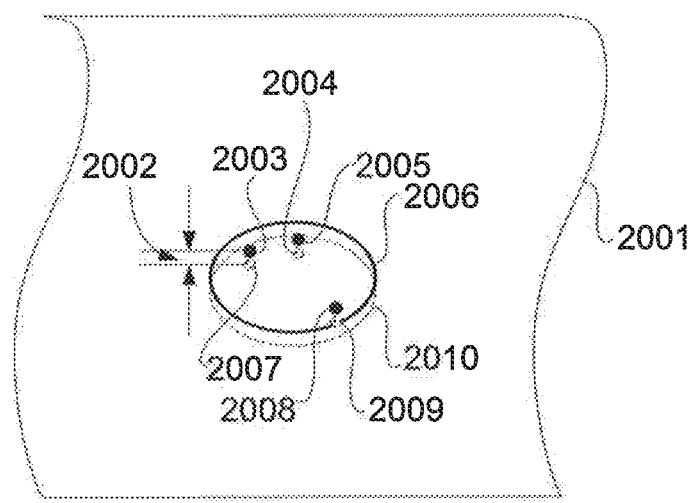
FIG. 20 illustrates how comparison between a reference image and a captured target image can yield a relative displacement measurement.

FIG. 20 illustrates how comparison between a reference image and a captured target image can yield a relative displacement measurement, and depicts a reference image 2001 and a region 2006 within the reference image. The reference region 2006 contains three simulated dots 2003, 2005 and 2008 that correspond to ideal ink droplet ejection locations. The print head 210 prints, in accordance with the aforementioned reference dot locations, inkjet dots 2007, 2004 and 2009 on the print medium 230. A region 2010 of the printed swath on the print medium 230 containing those three inkjet dots 2007, 2004 and 2009 is a region on the printed document that corresponds to the reference region 2006 in the reference image with simulated dots 2003, 2005 and 2008. The region 2010 is captured as a target image by one of the print head sensors 370, 380. A vertical shift 2002 is evident between the reference image region 2006 and the captured target image region 2010.

Returning to FIG. 8C, once the reference image tiles 871-875 are constructed in the step 430, a vertical shift (displacement) δ between a captured image (e.g. 861-865) of the swath section 610 of the swath 611 (referred to as a "target image") captured by the sensor S2 (ie 380), and the corresponding reference image tile (e.g. 871-875), can be determined by aligning the reference image tile and the target image, as depicted in following steps 920 and 930, following respective arrows 912 and 913. The alignment may be performed in the Fourier domain by correlating the target image and the reference image tile. For reasons described above with reference to FIGS. 17 and 18, the reference image 870 should be simulated using enlarged Gaussian dots to minimise the effect of phase reversal in order to achieve accurate shift estimation. Thus, the reference image 870 and the reference image tiles 871-875 are simulated images using enlarged Gaussian dots (in one example).

Figure 10:
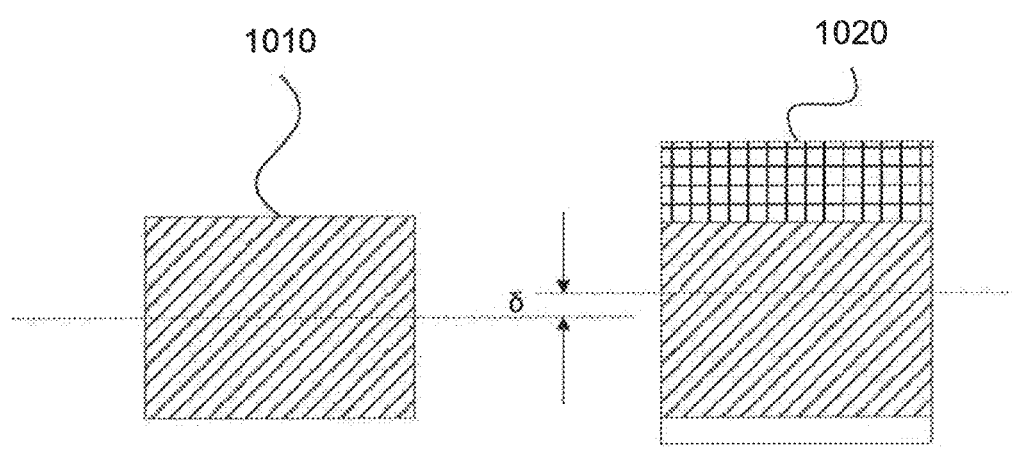
FIG. 10 illustrates the relative positions of different sections of the print head and the printed swaths.

FIG. 10 illustrates the relative positions of different sections of the print head and the printed swaths, and shows an example of a reference image tile 1010 associated with the area covered by the sensor S2, and the target image 1020 captured by the sensor S2. By aligning the reference image tile 1010 and the target image 1020 as depicted in FIG. 10, a 2-D shift (i.e. 2-dimensional displacement) between the reference image tile and the target image can be determined. Assuming that only the vertical displacement between the print head 210 and the print medium 230 is of interest, that is the displacement represents the actual line feed distance LF, then the relationship between the actual line feed distance LF and the vertical shift δ between the reference image 1010 and the target image 1020 can be determined.

Assuming that δr, which is a parameter corresponding to the vertical shift between the reference image tile 1010 and the target image 1020 for the case of no line feed error, is known, line feed error can be calculated as the difference between δ and δr.

Referring back to FIG. 4, following an arrow 418 a following step 470 determines if the printing of the page is finished. If this is not the case, the process 400 follows a NO arrow 421 and returns to the step 410 that constructs the next swath, comprising four swath sections, using information about the calculated (actual) line feed distance LF, followed by printing the constructed next swath as depicted in FIG. 8C. If the page is determined to have finished at the step 470, the method 400 follows a YES arrow 419 and ends at a step 499. In this manner the printer prints successive next swaths as long as the end of the page is not reached. This calibration and printing process continues for each swath until the print head reaches the end of the page as determined by the step 470.

FIG. 8C also shows a second quarter 820 of a swath that is printed on top of the first quarter 610 of the previous swath. Similarly, the same area 610 is subsequently further overprinted by a third quarter of a following swath and a fourth quarter of a further following swath. In other words, the final appearance of the printed area is constructed by 4 successive print passes.

Figure 12:
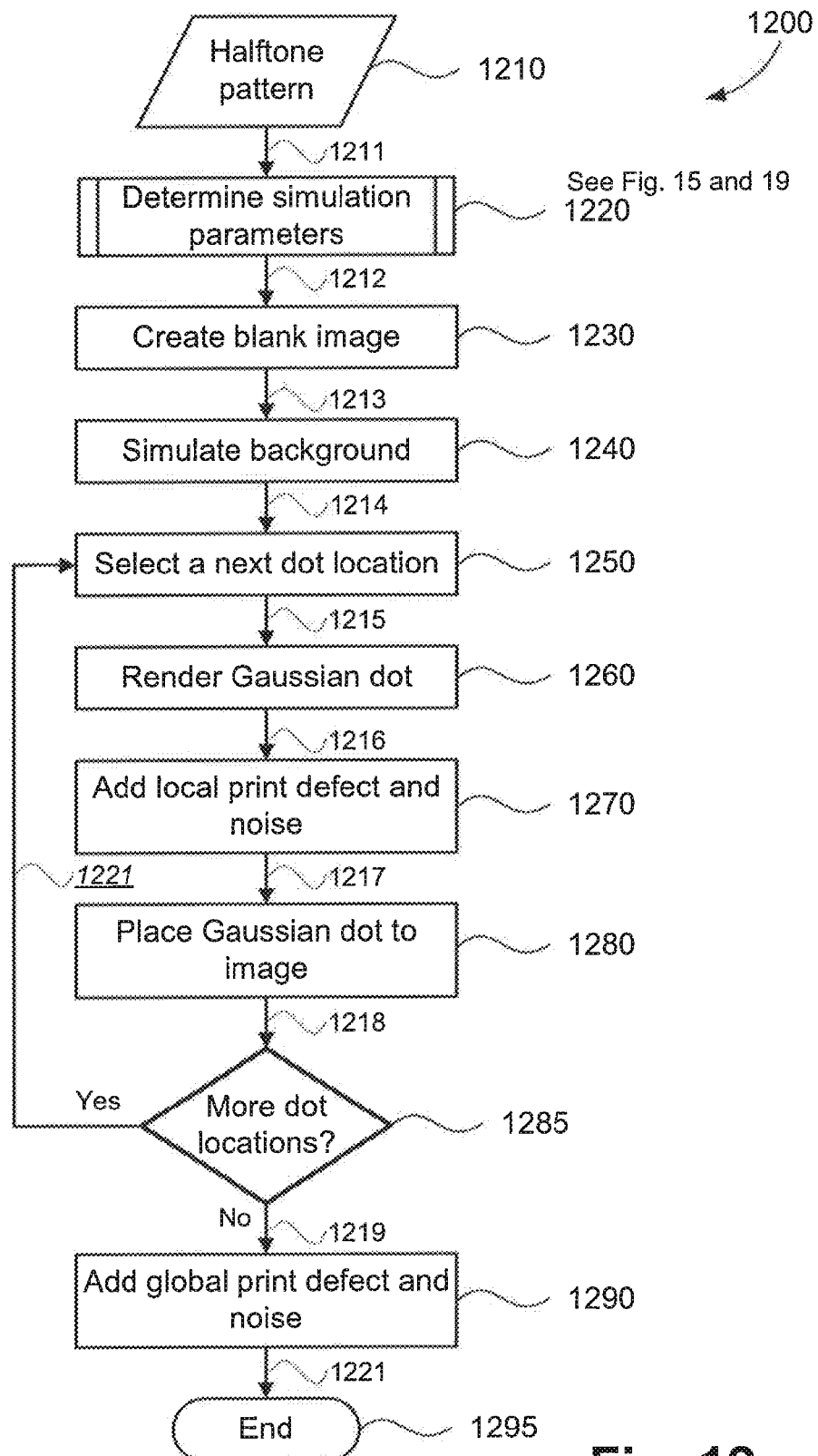
FIG. 12 shows a flow diagram of a process for simulating a reference image.
Figure 14A:
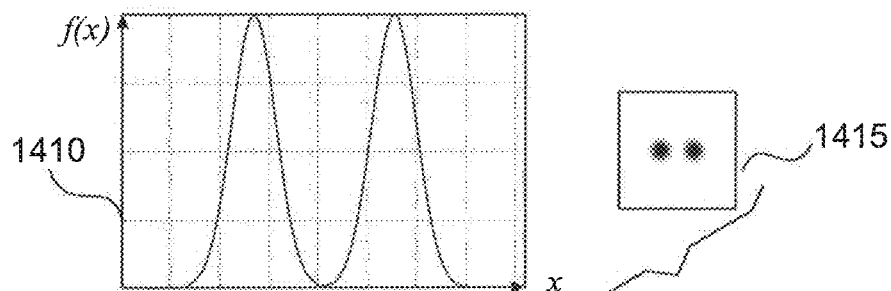
FIGS. 14A-14E illustrate the effect of changing a dot size parameter when simulating Gaussian dots.
Figure 14B:
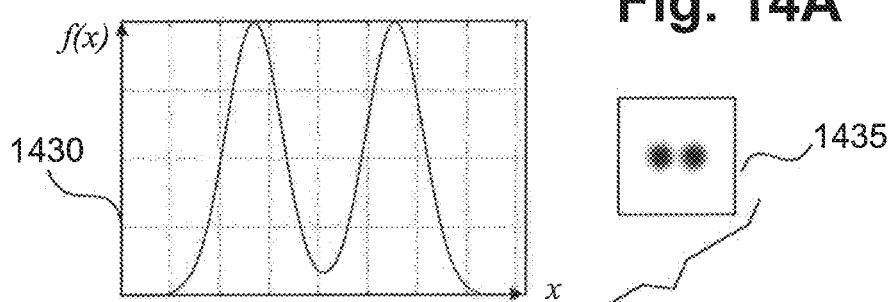
Figure 14C:
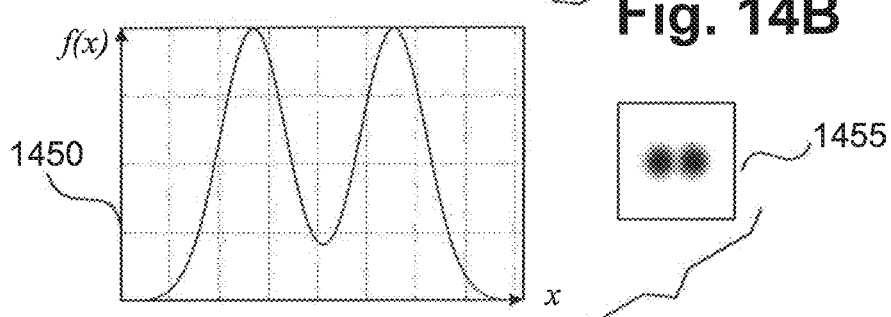
Figure 14D:
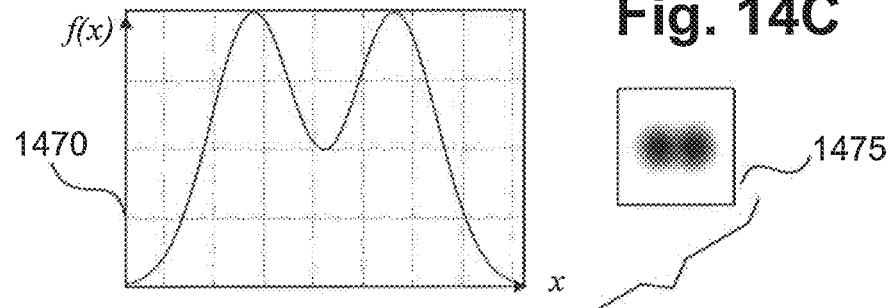
Figure 14E:
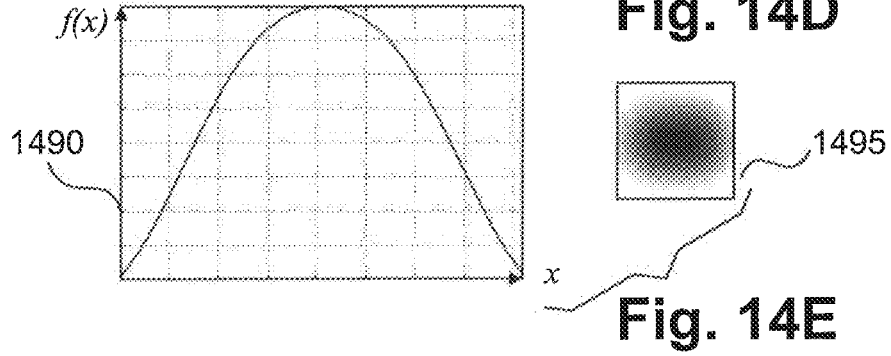

FIG. 12 shows a flow diagram of a process for creating a simulated reference image, and depicts a method 1200 of simulating a reference image for line feed measurement, as executed at the step 430. The method 1200 begins by receiving a halftone pattern 1210, which may be the bi-level image 561, a tile of the bi-level image 561 or a list of 2D coordinate locations representing desired ink droplet ejection locations. Following a step 1211 the method 1200 uses the halftone pattern 1210 and a number of predetermined printer system parameters or characteristics, such as sensor capture resolution and satellite dot distribution, to determine a set of simulation parameters in a following step 1220, described hereinafter in more detail with reference to FIG. 15. The simulation parameter set may include, but is not limited to, dot profile type, dot size, magnitude, resolution, scale, dot placement variance, satellite probability, satellite size, satellite position, background level and noise type, print head tilt angle, print head speed, blocked nozzle probability, and sensor noise type and level.

Based on the determined simulation parameters, following a step 1212 a blank reference image such as 870 or 871 is created in a step 1230. A background for the reference image is simulated following a step 1213 in a step 1240 using parameters such as background level and noise type, and sensor noise level and type. Following a step 1214, in a following step 1250 the dot locations within the halftone pattern 1210 are iteratively processed one at a time.

Following a step 1215, for each halftone dot location, an enlarged Gaussian dot is rendered based on the dot size, scale and other simulation parameters in a step 1260. Following a step 1216 in a following step 1270, local print defects and noise such as satellites are added to the rendered Gaussian dot. The rendered Gaussian dot is then transferred, following a step 1217, to the reference image in step 1280, taking into account simulation parameters such as dot placement variance and print head tilt angle.

Following a step 1218 the method 1200 determines, at a decision step 1285, if there are more dot locations to be processed. If there are, the method 1200 follows a YES arrow 1221 and continues processing the next dot location at the step 1250. Otherwise, following a NO arrow 1219 from the step 1285, processing moves to a step 1290, where global print defect and noise such as motion blur and sensor noise are added to the reference image. The method 1200 then follows a step 1221 and terminates at a step 1295.

Figure 15:
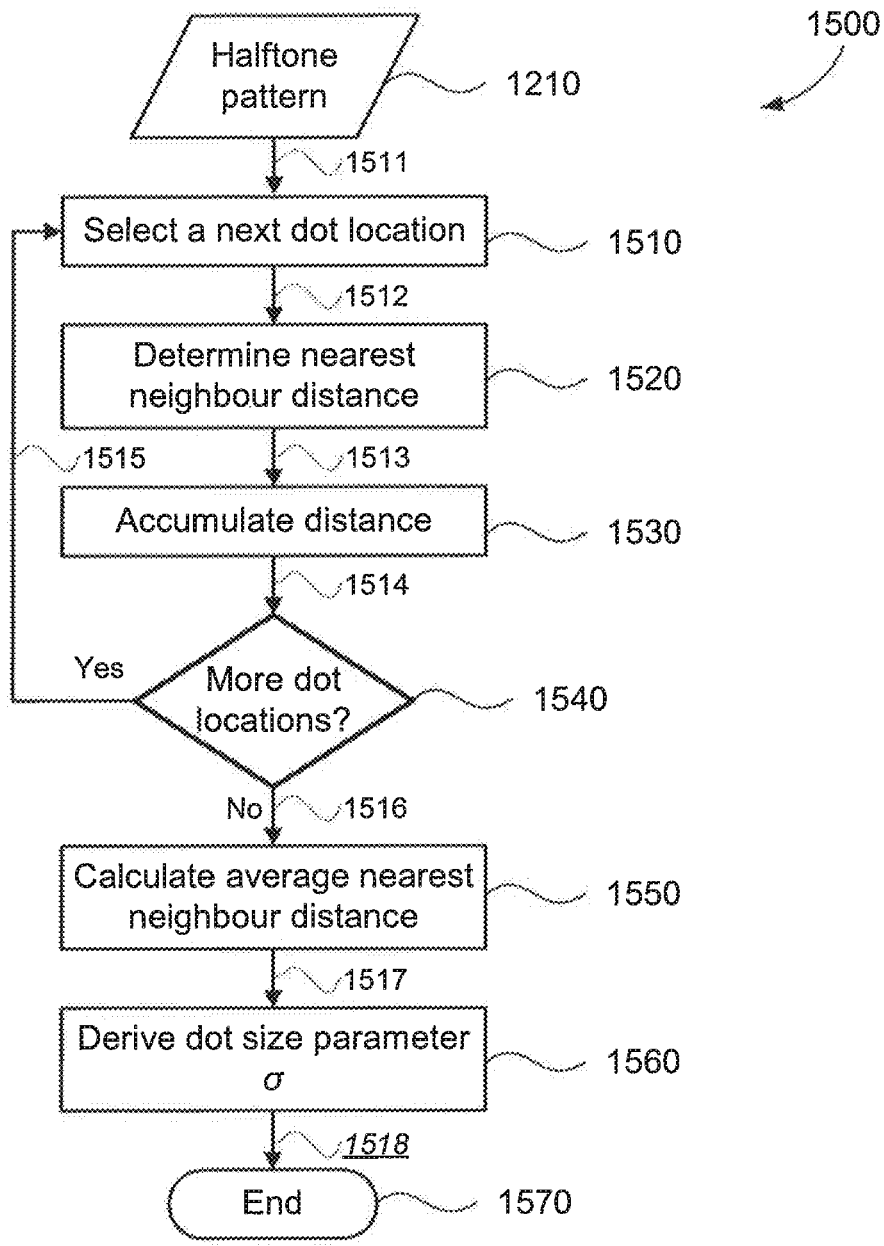
FIG. 15 shows a flow diagram for determining a suitable dot size parameter for simulation.

FIG. 15 shows a flow diagram for determining a suitable dot size parameter for simulation, and depicts a method 1500 for determining a dot size parameter as executed at the step 1220. The method 1500 begins by processing a halftone pattern 1210, which may be the bi-level image 561, a tile or region of the bi-level image 561 or a list of 2D coordinate locations representing ink droplet ejection locations. Accordingly, the determination of the dot size parameter may be performed over an entire image or over one or more parts or regions of the image, such regions having associated local dot per unit area measures. The method 1500 uses the halftone pattern 1210 to determine a suitable dot size parameter σ for simulating enlarged Gaussian dots in the reference image. The halftone pattern in this example is a uniform distribution of pseudo-noise dots.

Following a step 1511, in a following step 1510, the dot locations within the halftone pattern 1210 are iteratively processed one at a time. Importantly, it is the dot locations that are processed in order to determine the simulated dot sizes and not any other attributes of the dots in the halftone pattern. Following a step 1512, for each halftone dot location, a nearest neighbour distance is determined in a following step 1520. The nearest neighbour distance for halftone dot location i is expressed as follows:

$$r_i = \min_j |d_i - d_j|, d_j \in \mathcal{D}$$

Where: $r_i$ is the nearest neighbour distance for halftone dot location i, $d_j$ is a halftone dot at location j, and D is the set of all halftone dot locations in a specified neighbourhood. Following an arrow 1513 the nearest neighbour distance for each dot location is accumulated at a step 1530.

Following an arrow 1514 the method 1500 determines at a decision step 1540 if there are more dot locations to be processed. If there are, the method 1500 follows a YES arrow 1515 and continues processing the next dot location at the step 1510. Otherwise, processing follows a NO arrow 1516 and moves to a step 1550, where the average nearest neighbour distance is calculated as follows:

$$\bar{r} = \frac{\sum_i^{N_D} r_i}{N_D}$$

Where: $\bar{r}$ is the average nearest neighbour distance, $N_D$ is the total number of dot locations in D.

Following an arrow 1517 the average nearest neighbour distance is then used in a step 1560 to derive the dot size parameter σ for rendering enlarged simulated Gaussian dots in the reference image. In a preferred arrangement, the dot size parameter σ is determined by setting $\bar{r}$ to the FWHM as follows:

$$\sigma = \frac{\bar{r}}{2\sqrt{2\ln 2}}$$

The use of enlarged simulated dots in the reference image 870 or reference image tiles 871-875 to improve correlation accuracy may also be applied to non-uniformly distributed dot patterns such as gradation. In this case, the dot size parameter σ for halftone dot location i is determined by its nearest neighbour distance $r_i$ as follows:

$$\sigma_i = \frac{r_i}{2\sqrt{2\ln 2}}$$

FIGS. 14A-14E illustrate the effect of changing a dot size parameter when simulating Gaussian dots, and provides an illustration of applying a range of dot sizes for simulating enlarged Gaussian dots. FIGS. 14A-14E depict magnitude profiles 1410, 1430, 1450, 1470 and 1490 respectively for increasing size of Gaussian dots 1415, 1435, 1455, 1475 and 1495, respectively. Experimental results indicate that increasing the dot size, for example from 1415 to 1475, in the reference image tiles 871-875, improves the correlation accuracy. However, this enlargement of simulated Gaussian dot is limited by the dot spacing within each halftone dot pattern as the simulated Gaussian dots become too large and start to merge together as shown in the Gaussian dot tile 1495. The merged dot profile 1490 no longer preserves the two dot centre locations, thus becoming unsuitable for correlation. In general, as long as the dot centre locations are well preserved in the simulated reference image, accurate correlation results with captured image tiles can be achieved. Therefore, the process of determining a suitable simulated dot size parameter σ is a trade-off between enlarging the dot size as much as possible while preserving individual centre locations. Because of this, it will be apparent to those skilled in the art that alternative ways of deriving a suitable simulated dot size parameter σ may be practiced without departing from the scope and spirit of the invention, such as comparing the average nearest neighbour distance $\bar{r}$ to a distance that is slightly above or below the FWHM.

Figure 25:
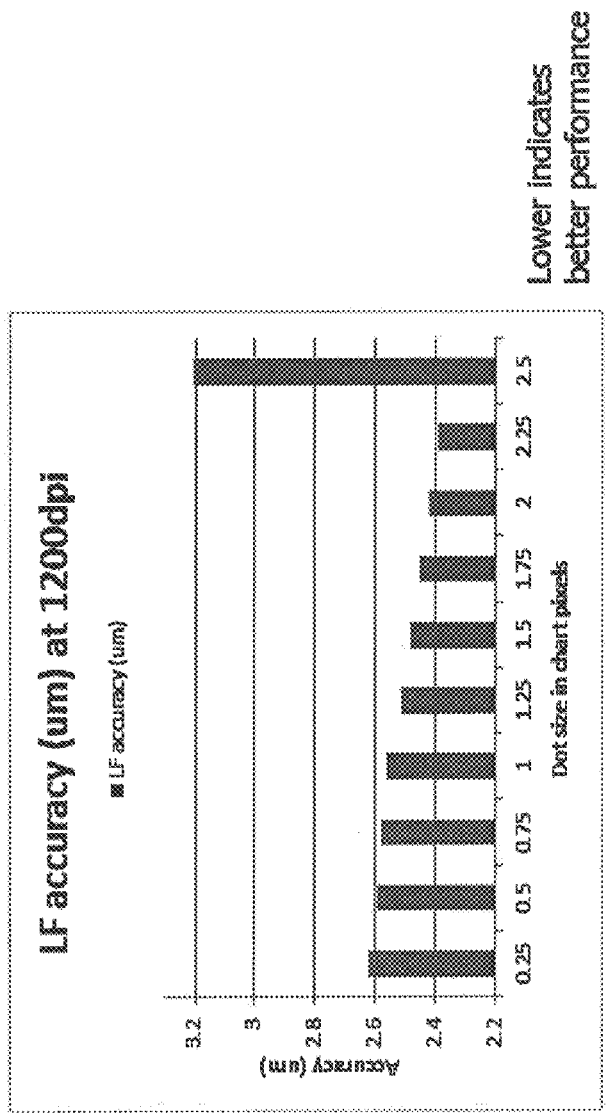
FIG. 25 shows experimental results for the ADGC arrangement.

FIG. 25 shows experimental results, for dot patterns with densities ranging from 0.5% to 25%, illustrating how the accuracy of line feed determination improves with increasing size of simulated dots in the reference pattern, until the restrictions depicted in FIG. 14 are violated. In particular, line feed determination accuracy improves from about 2.62 μm (at a simulated dot size of 0.25 chart pixels), to just under 2.4 μm (at a simulated dot size of 2.25 chart pixels). However line feed determination accuracy degrades dramatically to 3.2 μm at a simulated dot size of 2.5 chart pixels, because the merged dot profiles in the reference image no longer preserve the dot centre locations, thus becoming unsuitable for correlation.

FIGS. 13A, 13B and 13C show examples of simulated and real inkjet dot patterns, and depict results of simulating enlarged Gaussian dots in the reference image. A captured image tile of printed inkjet dots is shown at 1310 in FIG. 13A. Two reference image tiles corresponding to the captured tile 1310 are depicted at 1320 and 1330 in FIGS. 13B and 13C respectively. The reference image tile 1320 shows a Gaussian dot pattern with a suitably chosen dot size, where the dots are enlarged yet the dot centres are well preserved. In contrast, the reference image tile 1330 shows the outcome of using an overly large dot size parameter to simulate the Gaussian dots, where the relative positions of the dots are not preserved.

Returning to FIG. 15, following the determination of the dot size parameter σ, the method 1500 follows an arrow 1518 and terminates at a step 1570.

Figure 19:
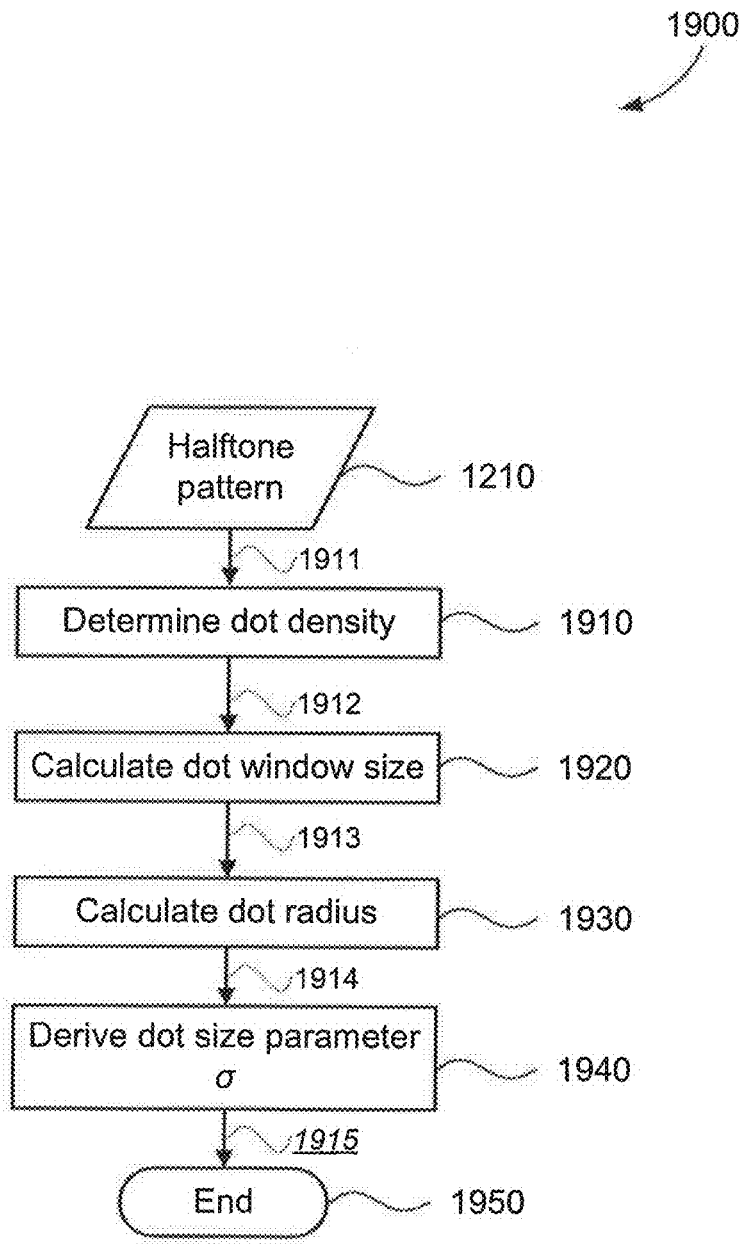
FIG. 19 shows a flow diagram for determining a dot size parameter based on local dot density.

FIG. 19 shows a flow diagram for determining a dot size parameter based on local dot density in an alternate ADGC arrangement, according to which the dot size parameter σ determination process in the step 1220 may be implemented according to the method of 1900. The method 1900 begins by processing a halftone pattern 1210, which may be the bi-level image 561, a tile of the bi-level image 561 or a list of 2D coordinate locations representing ink droplet ejection locations. The method 1900 uses the halftone pattern 1210 to determine a suitable dot size parameter σ for simulating enlarged Gaussian dots in the reference image. The halftone pattern is a uniform distribution of pseudo-noise dots.

Following an arrow 1911, in a following step 1910, the dot density of the halftone pattern 1210 is determined from information used in the pass division in density step 510, which is described hereinafter in greater detail with reference to FIG. 5. However, if that information is unavailable the density may be derived by counting the number of halftone dot locations within the halftone pattern 1210 and dividing by the area of the halftone pattern 1210.

Figure 21:
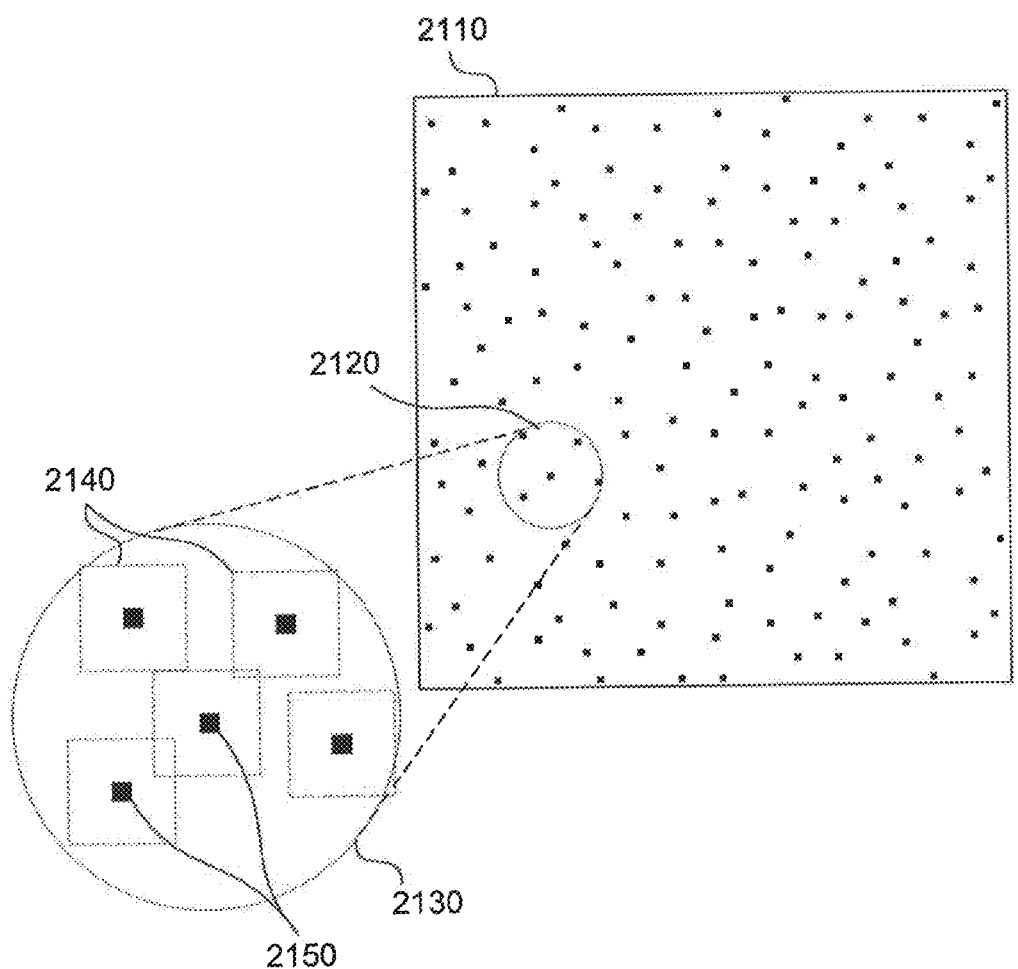
FIG. 21 depicts window regions for a halftone dot pattern.

In a uniformly distributed pseudo-random dot pattern, window regions 2140 of the same size may be constructed around each dot 2150 as shown in FIG. 21. The window is a square region centred at a dot location, representing an approximate space in which an enlarged Gaussian dot may fit. If each window has a size of $S_w \times S_w$, then the window size $S_w$ is calculated in step 1920 using the dot density as follows:

$$S_w = \sqrt{\frac{1}{\text{density}}}$$

Following an arrow 1913 the window size $S_w$ is then used to calculate the dot radius $R_d$ in a step 1930 as follows:

$$R_d = \frac{1}{2} S_w$$

Following an arrow 1914 the dot radius is further used in a following step 1940 to derive the dot size parameter σ for rendering enlarged Gaussian dots in the reference image. In a preferred arrangement, the dot size parameter σ is determined by setting $R_d$ to ½FWHM as follows:

$$\sigma = \frac{R_d}{\sqrt{2\ln 2}}$$

Following an arrow 1915 the method 1900 then terminates at a step 1950.

In general, as long as the dot centre locations are well preserved in the simulated reference image, accurate correlation results with captured image tiles can be achieved. Therefore, the process of determining a suitable simulated dot size parameter σ is a trade-off between enlarging the dot size as much as possible while preserving individual centre locations. Because of this, it will be apparent to those skilled in the art that alternative ways of deriving a suitable simu- lated dot size parameter σ may be practiced without departing from the scope and spirit of the invention, such as comparing the dot radius $R_d$ to a distance that is slightly above or below ½FWHM.

In a uniformly distributed pseudo-random dot pattern, the dot density defines a dot frequency measure reflecting a number of dots to be printed on at least a part of the print medium such that a high dot density corresponds to a high dot frequency, and a low density to a low frequency. With the dot spacing being inversely related to the dot frequency, thus it is established that the simulated dot size a in the reference image 870 is inversely related to the dot frequency. That is, according to the step 430, a halftone pattern with a low dot frequency will have a relatively larger simulated dot size in the reference image than the simulated dot size in the reference image for a halftone pattern with a high dot frequency.

An alternate ADGC arrangement for measuring and calibrating the line feed distance of a printer offline is described with reference to FIG. 24.

Figure 24:
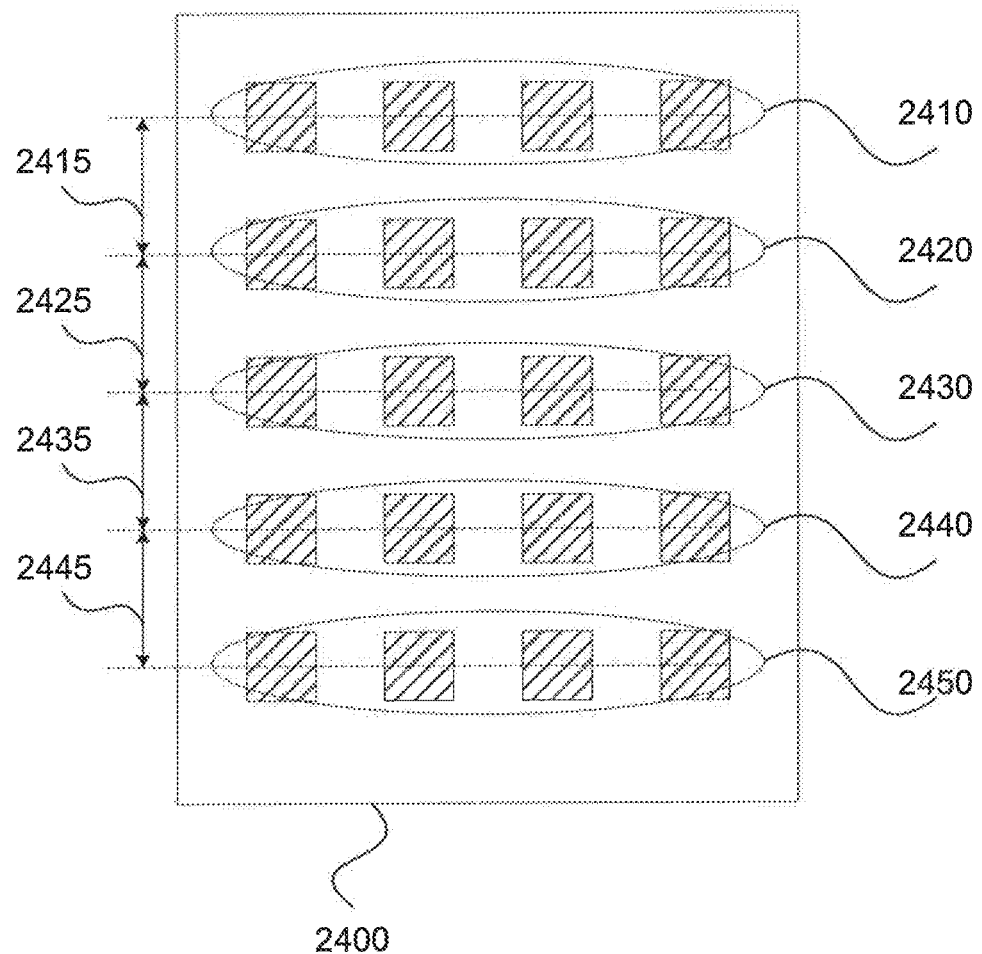
FIG. 24 shows a layout of a test chart in an alternate ADGC arrangement.

FIG. 24 shows a test chart 2400 that is used in this arrangement. The test chart 2400 consists of tile rows 2410, 2420, 2430, 2440 and 2450. Each tile row consists of a number of pseudo-noise dot tile patterns. The tile rows are designed such that each row is printed after a single line feed advancement by the printer. For example, the row 2420 is printed after the advancement of the line feed distance 2415. For each printed tile, there is a corresponding reference image tile simulating the same pseudo-noise pattern using enlarged Gaussian dots as described above.

The alternate ADGC arrangement is designed to operate in an offline fashion, in which the test chart 2400 is first printed by the printer 101. The printed chart is then scanned by an optical capturing system such as a flat-bed scanner. The alternate ADGC arrangement performs correlation operations between the scanned image and corresponding reference image tiles of enlarged Gaussian dots. In this way, locations of the printed tiles within the scanned image may be determined. The actual line feed distance (e.g. 2415, 2425, 2435 and 2445) between any two printed tile rows is determined as the distance between their average horizontal tile centre locations and this measured line feed distance is used to calibrate the printer for further printing. Since the reference tiles have enlarged Gaussian dots, the correlation provides improved measurement accuracy by minimising phase reversal.

In another alternate ADGC arrangement, non-Gaussian dots may be used for simulating the reference image 870 in the step 430. That is each dot in the reference image 870 may be modelled in the spatial domain using, for example, a polynomial function.

In yet another alternate ADGC arrangement, the enlargement of a Gaussian dot in the reference image 870 may be implemented by applying Gaussian blur to a smaller Gaussian dot.

The use of enlarged simulated reference dots to improve correlation accuracy may also be applied to other alignment-based applications such as measuring substrate speed in a continuous printing system. In this application, an optical capturing device is used to capture the printed medium continuously at known intervals. Each captured image is then compared to its corresponding digital reference image, which is simulated using enlarged Gaussian dots, to determine the distance traveled by the substrate over a single capturing interval. Thus, the substrate speed is accurately determined through the correlation of a printed dot pattern and a digital reference simulated using enlarged Gaussian or other suitable dots.

INDUSTRIAL APPLICABILITY

The arrangements described are applicable to the computer and data processing industries and particularly for the printing and reproduction industries.

The foregoing describes only some embodiments of the present invention, and modifications and/or changes can be made thereto without departing from the scope and spirit of the invention, the embodiments being illustrative and not restrictive.

What is claimed is:

1. A method of determining a characteristic of an image forming apparatus, the method comprising:
   receiving halftone data defining a plurality of dot locations of a plurality of dots to be printed on a print medium;
   calculating distances between the plurality of dot locations in the received halftone data;
   determining a size of each simulated dot in a simulated reference image based on the calculated distances between the plurality of dot locations in the received halftone data, wherein determining the size of the plurality of simulated dots includes growing a size of the plurality of simulated dots based on the distances between the received plurality of dot locations, and wherein a Full Width at Half Maximum (FWHM) is utilized in determining the size of the plurality of simulated dots;
   forming the simulated reference image of the halftone data by transferring a plurality of simulated dots having the size determined based on the distances between the received plurality of dot locations onto the received plurality of dot locations in the halftone data;
   printing, using a print head of the image forming apparatus, the halftone data on the print medium to form a printed image having a plurality of printed dots; and
   determining a characteristic of the image forming apparatus by comparing the plurality of printed dots and the plurality of simulated dots in the simulated reference image, wherein growing the size of the plurality of simulated dots improves accuracy of the comparison.

2. The method according to claim 1, wherein the plurality of simulated dots in the simulated reference image are formed in a spatial domain using at least one of a Gaussian function and a polynomial function.

3. The method according to claim 1, wherein comparing the printed image and the simulated reference image is performed using cross correlation.

4. The method according to claim 1 wherein, for each simulated dot, the size of the simulated dot is determined by:
   determining a nearest neighbor distance between the simulated dot and a set of simulated dots in a specified neighborhood,
   calculating an average nearest neighbor distance from the determined nearest neighbor distances, and
   determining the size of the plurality of simulated dots dependent upon the average nearest neighbor distance.

5. The method according to claim 4, wherein a Full Width at Half Maximum (FWHM) of the plurality of simulated dots is between half the average nearest neighbor distance and the nearest neighbor distance, and wherein the Full Width at Half Maximum is utilized in determining the size of the plurality of simulated dots.

6. The method according to claim 1, wherein the size of the plurality of simulated dots preserves center locations of the plurality of simulated dots.

7. The method according to claim 1, wherein the size of each dot in the simulated reference image is determined by simulating a distortion of the plurality of dots in the printed image based on a print/scan model, wherein the distortion is introduced by the image forming apparatus.

8. The method according to claim 1, wherein spacing between adjacent dots in the simulated reference image satisfies a predetermined criterion.

9. The method according to claim 8, wherein the predetermined criterion is distances between the location of a target dot and locations of nearest neighbor dots of the target dot.

10. The method according to claim 1, further comprising determining a dot size of a simulated dot based on a corresponding dot spacing.

11. The method according to claim 1, wherein growing the size of the plurality of simulated dots based on the distances between the received plurality of dot locations reduces a phase reversal effect when comparing the plurality of printed dots and the plurality of simulated dots.

12. The method according to claim 1, further comprising enlarging the size of the plurality of simulated dots based on the distances between the received plurality of dot locations while individual dot center locations of each simulated dot are preserved.

13. The method according to claim 1, wherein determining the size of a dot in the plurality of simulated dots is based on distances between adjacent dot locations in the simulated reference image.

14. The method according to claim 13, wherein determining the size of a target dot in the plurality of simulated dots is based on distances between the location of the target dot and locations of nearest neighbor dots of the target dot.

15. The method according to claim 1, wherein printing the halftone data includes making a first pass to print a first pass dot pattern from a plurality of dot patterns, the method further comprising:
 capturing a first pass dot pattern image of the first pass dot pattern prior to making additional passes to print additional dot patterns,
 wherein determining the characteristic includes determining the characteristic, prior to making additional passes to print additional dot patterns, by comparing of the captured first pass dot pattern image and the plurality of simulated dots; and
 using the determined characteristic to calibrate the image forming apparatus.

16. The method according to claim 1, wherein determining a size of the plurality of simulated dots in the simulated reference image based on the distances between the received plurality of dot locations includes utilizing the distances between the received plurality of dot locations to determine a nearest average neighbor distance.

17. The method according to claim 1, wherein determining a size of the plurality of simulated dots in the simulated reference image based on the distances between the received plurality of dot locations includes utilizing a dot density which is based upon a number of dots uniformly distributed per unit area.

18. The method according to claim 1, wherein the determined distances between the received plurality of dot locations are utilized to determine the size of the plurality of simulated dots.

19. The method according to claim 1,
 wherein the characteristic is actual line feed distance and comparing the plurality of printed dots and the plurality of simulated dots includes using the image forming apparatus to align a captured image of the plurality of printed dots with the plurality of simulated dots.

20. The method according to claim 1, wherein the image forming apparatus is an inkjet printer and printing the halftone data includes propelling droplets of ink onto the print medium.

21. The method according to claim 1, wherein the determined characteristic of the image forming apparatus is at least one of line feed errors, background level and noise, blocked nozzle, blocked nozzle probability, color registration errors, dot contrast, dot placement variance, dot profile type, dot size, individual dot placement errors, inkjet drop satellites, magnitude, print head speed, print head tilt angle, print head tilt errors, resolution, satellite position, satellite probability, satellite size, scale, sensor noise, and sensor noise type and level.

22. The method according to claim 1, wherein each dot location is associated with a local distance between said dot location and neighbor dot locations, and wherein at least two dot locations of the simulated reference image have different determined dot sizes based on the local distance.

23. The method according to claim 1, wherein accuracy of determining a line feed error is non-linearly dependent on the size of the simulated dots.

24. The method according to claim 1, wherein a Full Width at Half Maximum (FWHM) of the plurality of simulated dots is about an average nearest neighbor distance.

25. An apparatus for determining a characteristic of an image forming apparatus, the apparatus comprising:
 a processor; an
 a memory storing a computer executable software program for directing the processor to effect a method, the method comprising:
 receiving halftone data defining a plurality of dot locations of a plurality of dots to be printed on a print medium,
 calculating distances between the plurality of dot locations in the received halftone data,
 determining a size of each simulated dot in a simulated reference image based on the calculated distances between the plurality of dot locations in the received halftone data, wherein determining the size of the plurality of simulated dots includes growing a size of the plurality of simulated dots based on the distances between the received plurality of dot locations, and wherein a Full Width at Half Maximum (FWHM) is utilized in determining the size of the plurality of simulated dots,
 forming the simulated reference image of the halftone data by transferring a plurality of simulated dots having the size determined based on the distances between the received plurality of dot locations onto the received plurality of dot locations in the halftone data,
 printing, using a print head of the image forming apparatus, the halftone data on the print medium to form a printed image having a plurality of printed dots, and
 determining a characteristic of the image forming apparatus by comparing the plurality of printed dots and the plurality of simulated dots in the simulated reference image, wherein growing the size of the plurality of simulated dots improves accuracy of the comparison.

26. A non-transitory computer readable medium storing a program to cause a computer to perform a method of determining a characteristic of an image forming apparatus, the method comprising:

receiving halftone data defining a plurality of dot locations of a plurality of dots to be printed on a print medium;

calculating distances between the plurality of dot locations in the received halftone data;

determining a size of each simulated dot in a simulated reference image based on the calculated distances between the plurality of dot locations in the received halftone data, wherein determining the size of the plurality of simulated dots includes growing a size of the plurality of simulated dots based on the distances between the received plurality of dot locations, and wherein a Full Width at Half Maximum (FWHM) is utilized in determining the size of the plurality of simulated dots;

forming the simulated reference image of the halftone data by transferring a plurality of simulated dots having the size determined based on the distances between the received plurality of dot locations onto the received plurality of dot locations in the halftone data;

printing, using a print head of the image forming apparatus, the halftone data on the print medium to form a printed image having a plurality of printed dots; and determining a characteristic of the image forming apparatus by comparing the plurality of printed dots and the plurality of simulated dots in the simulated reference image, wherein growing the size of the plurality of simulated dots improves accuracy of the comparison.

27. A method of determining a characteristic of an image forming apparatus, the method comprising:

receiving halftone data defining a plurality of dot locations of a plurality of dots to be printed on a print medium;

calculating distances between the received plurality of dot locations in the halftone data;

determining a degree of enlarging a plurality of dots in the halftone data based on the calculated distances between the received plurality of dot locations;

forming a simulated reference image of the halftone data by changing the plurality of dots in the halftone data into a plurality of enlarged dots at the degree of enlarging determined based on the distances between the received plurality of dot locations, and wherein a Full Width at Half Maximum (FWHM) of the plurality of enlarged dots is about an average nearest neighbor distance;

printing, using a print head of the image forming apparatus, the halftone data on the print medium to form a printed image having a plurality of printed dots; and determining a characteristic of the image forming apparatus by comparing the plurality of printed dots and the plurality of enlarged dots in the simulated reference image, wherein the degree of enlarging the plurality of dots improves accuracy of the comparison.

* * * * *